(12) United States Patent
Yamaguchi

(10) Patent No.: US 8,804,184 B2
(45) Date of Patent: Aug. 12, 2014

(54) IMAGE PROCESSING APPARATUS, MANAGEMENT SYSTEM AND CONTROL METHOD THEREOF

(75) Inventor: Takeshi Yamaguchi, Osaka (JP)

(73) Assignee: Sharp Kabushiki Kaisha, Osaka-Shi, Osaka (JP)

( * ) Notice: Subject to any disclaimer, the term of this patent is extended or adjusted under 35 U.S.C. 154(b) by 529 days.

(21) Appl. No.: 13/209,697

(22) Filed: Aug. 15, 2011

(65) Prior Publication Data

US 2012/0044539 A1  Feb. 23, 2012

(30) Foreign Application Priority Data

Aug. 20, 2010  (JP) .................................. 2010-184505

(51) Int. Cl.
  *G06F 3/12* (2006.01)
  *G06K 15/00* (2006.01)
(52) U.S. Cl.
  USPC ........ 358/1.16; 358/1.13; 358/1.14; 358/1.15
(58) Field of Classification Search
  USPC .............................. 358/1.13, 1.14, 1.15, 1.16
  See application file for complete search history.

(56) References Cited

U.S. PATENT DOCUMENTS

| | | | |
|---|---|---|---|
| 5,752,128 A | 5/1998 | Yamashita | |
| 6,185,321 B1 * | 2/2001 | Fukushima et al. | 382/135 |
| 6,570,667 B1 * | 5/2003 | Hattori et al. | 358/1.15 |
| 7,456,992 B2 * | 11/2008 | Fukuhara et al. | 358/1.16 |
| 8,111,414 B2 * | 2/2012 | Sato et al. | 358/1.15 |
| 2004/0008375 A1 | 1/2004 | Fukuhara et al. | |
| 2007/0192868 A1 | 8/2007 | Fujino | |

FOREIGN PATENT DOCUMENTS

| | | |
|---|---|---|
| CN | 1482551 A | 3/2004 |
| CN | 1812463 A | 8/2006 |
| JP | 6326790 A | 11/1994 |
| JP | 9090825 A | 4/1997 |
| JP | 2004048452 A | 2/2004 |
| JP | 2004159046 A | 6/2004 |
| JP | 2005091964 A | 4/2005 |

* cited by examiner

*Primary Examiner* — Firmin Backer
*Assistant Examiner* — Jonathan Beckley
(74) *Attorney, Agent, or Firm* — Edwards Wildman Palmer LLP; David G. Conlin; David J. Silvia

(57) ABSTRACT

In an image processing apparatus, an HDD stores registration data, an operation unit receives an instruction requesting erasure of the registration data, and a control unit erases the registration data and restricts operations of the image processing apparatus in response to the instruction. Further, the HDD stores unique information unique to the image processing apparatus and changeable information that is changed in response to the erasure of registration data. If it is determined that a cancellation key generated by a management server and received by the operation unit is a cancellation key corresponding to the unique information and the changeable information, the control unit cancels the operation restriction of the image processing apparatus.

13 Claims, 16 Drawing Sheets

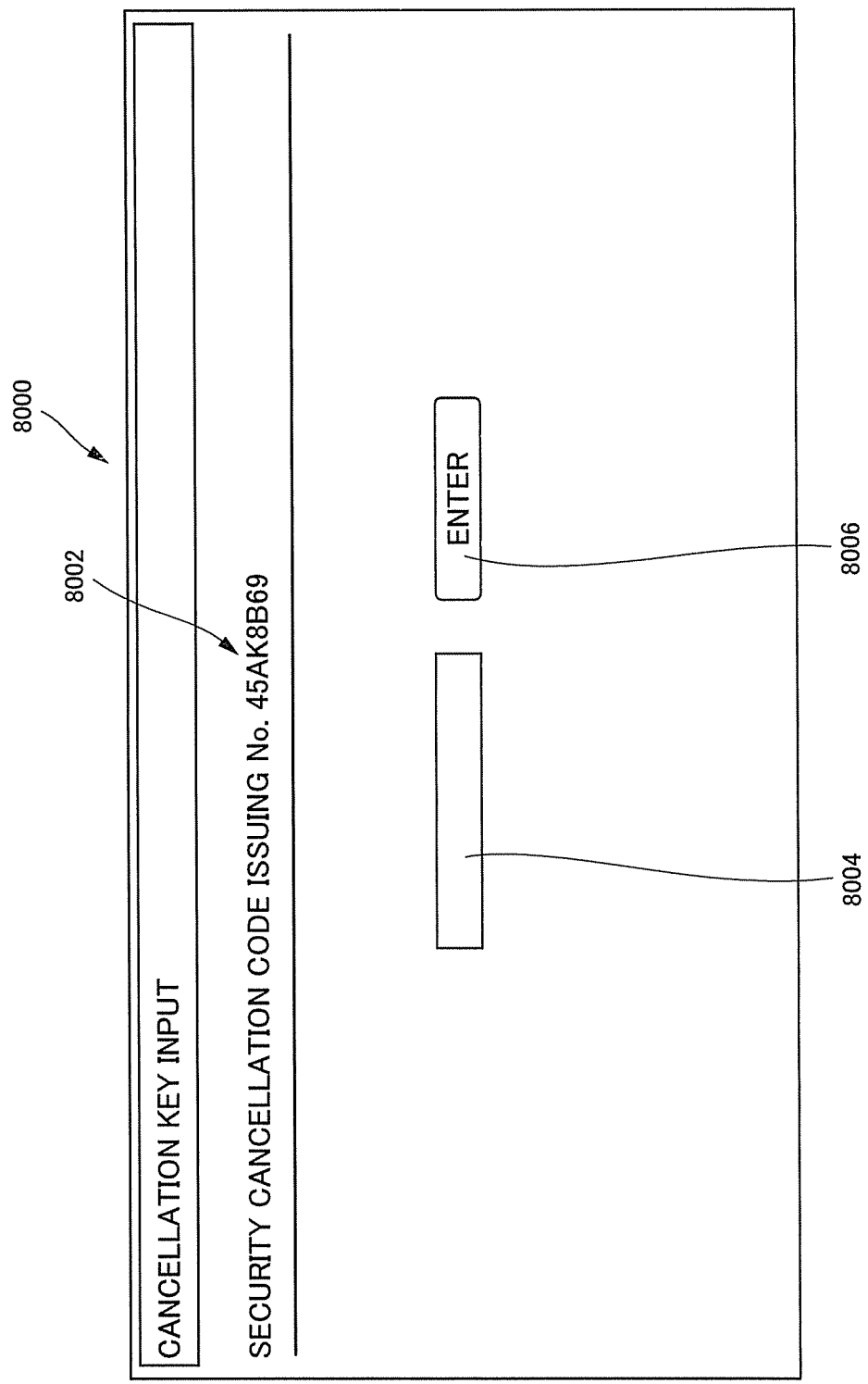

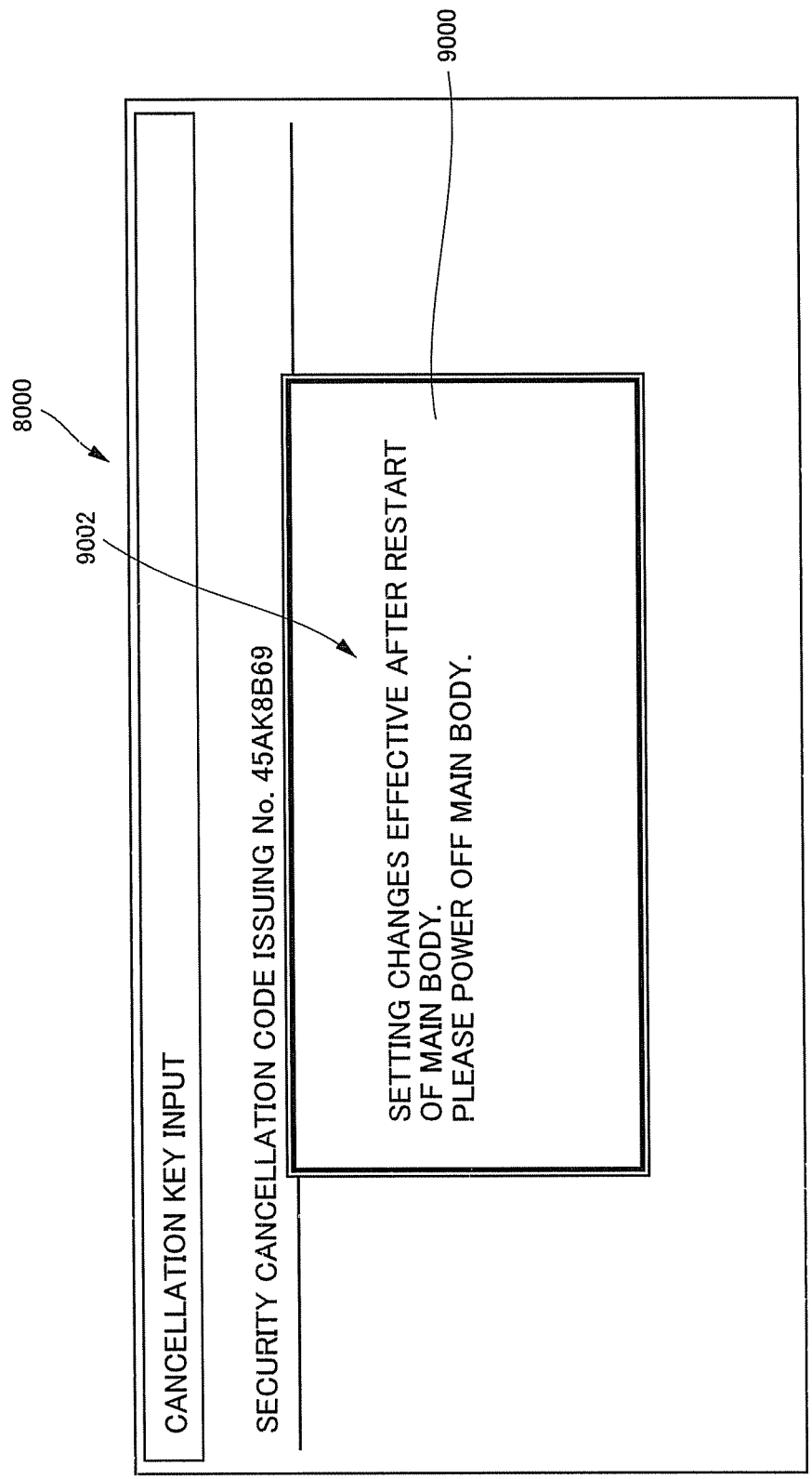

IMAGE PROCESSING APPARATUS, MANAGEMENT SYSTEM AND CONTROL METHOD THEREOF

CROSS-REFERENCE TO RELATED APPLICATION

This nonprovisional application claims priority under 35 U.S.C. §119(a) on Patent Application No. 2010-184505 filed in Japan on Aug. 20, 2010, the entire contents of which are hereby incorporated by reference.

BACKGROUND OF THE INVENTION

1. Field of the Invention

The present invention relates to an image processing apparatus, a management system and a control method of these. More specifically, the present invention relates to a technique for restricting operations of an image processing apparatus and for cancelling the restriction.

2. Description of the Background Art

Conventionally, a management system including an image forming apparatus as one type of image processing apparatuses and a management server managing the image forming apparatus connected to each other through a network has been widely used. In such a management system, a technique to prevent use of services and functions of the image forming apparatus after expiration of contract term has been known.

By way of example, Japanese Patent Laying-Open No. 9-90825 (hereinafter referred to as '825 Reference) discloses an image forming apparatus that compares current operation data with renewal conditions of the maintenance contract. In the image forming apparatus, if expiration of the maintenance contract is detected, a message urging contract renewal is displayed, and the operation enters a restricted copy operation mode. Japanese Patent Laying-Open No. 6-326790 (hereinafter referred to as '790 Reference) discloses an image forming apparatus that displays termination of contract term when the contract expires and enters a use inhibited state.

In the techniques described above, when the service contract is to be renewed, by way of example, an administrator of the image forming apparatus obtains a cancellation code from a management server and inputs the obtained cancellation code to the image forming apparatus, to cancel the operation restriction of the image forming apparatus. If the service contract is not to be renewed, the image forming apparatus as the object of contract is picked up and recovered by the contractor.

At the time of contract expiration, the image forming apparatus has confidential information stored therein, including image data input at the place of installation and FAX numbers of communication partners. Therefore, the administrator of the image forming apparatus must have such pieces of information deleted before pick-up, in order to avoid leakage of confidential information.

Japanese Patent Laying-Open No. 2004-48452 (hereinafter referred to as '452 Reference) discloses a technique of destroying stored image data and information necessary for processing the image data in accordance with an instruction from an administrator when an image forming apparatus is to be replaced or disposed of and, after destruction, restricting an operation of processing the image data.

Further, Japanese Patent Laying-Open No. 2004-159046 (hereinafter referred to as '046 Reference) discloses a technique of destroying stored image data and information necessary for processing the image data in accordance with an instruction from an administrator when an image forming apparatus is to be replaced, and thereafter, notifying the completion of the process to the user.

According to the conventional techniques disclosed, for example, in '825, '790, '452 and '046 References, a cancellation code is input as a method of cancelling operation restriction of the image processing apparatus (image forming apparatus). Confidentiality of the cancellation code, however, is insufficient and, therefore, the operation restriction of the image processing apparatus may possibly be cancelled by a third party getting the cancellation code illegally.

SUMMARY OF THE INVENTION

In view of the problems above, it is desirable to provide an image processing apparatus and a management system that can safely cancel operation restriction of the apparatus.

According to an aspect, the present invention provides an image processing apparatus executing a process corresponding to a requested function. The image processing apparatus includes: a first storage unit storing registration information registered for executing the function; a receiving unit receiving an instruction requesting erasure of the registration information stored in the first storage unit; an erasing unit, responsive to reception of the instruction by the receiving unit, for erasing the registration information stored in the first storage unit; a restricting unit, responsive to erasure of the registration information by the erasing unit, for restricting an operation of the image processing apparatus; a second storage unit storing unique information unique to the image processing apparatus and changeable information changed in response to the erasure of the registration information by the erasing unit; an input unit receiving an input of cancellation information for cancelling the operation restriction imposed by the restricting unit; a determining unit, responsive to the input unit receiving input of the cancellation information, for determining whether the received cancellation information is cancellation information corresponding to the unique information and the changeable information stored in the second storage unit; and a cancelling unit cancelling, if the received cancellation information is determined to be the cancellation information corresponding to the unique information and the changeable information by the determining unit, the operation restriction imposed by the restricting unit.

As described above, the operation restriction of the image processing apparatus is cancelled if the input cancellation information is cancellation information corresponding to the piece of unique information unique to the image processing apparatus and the piece of changeable information that is changed in accordance with erasure of registration information. Specifically, the cancellation information is set to be different every time the registration information is erased and, therefore, confidentiality of the cancellation information can be maintained. Consequently, it becomes possible to prevent unauthorized cancellation of the operation restriction of the image processing apparatus by a third party illegally getting past cancellation information and, therefore, an image processing apparatus enabling safe cancellation of operation restriction can be provided.

Further, in response to erasure of the registration information, the operation of image processing apparatus is restricted. Therefore, it is possible to prevent leakage of registration information when, for example, the apparatus is picked up for recovery after expiration of service contract. This prevents any trouble related to the sale of recovered image processing apparatus.

Preferably, the changeable information is the number of erasure of registration information by the erasing unit. Therefore, the cancellation information is set to be different more easily and with higher reliability, every time the registration information is erased. As a result, confidentiality of the cancellation information can be maintained more easily with higher reliability.

More preferably, the changeable information is the number of cancellation of operation restriction by the cancelling unit. Therefore, the cancellation information is set to be different more easily and with higher reliability, every time the registration information is erased. As a result, confidentiality of the cancellation information can be maintained more easily with higher reliability.

More preferably, the image processing apparatus has at least one of scanner function, image data transmitting/receiving function and printer function, and the registration information includes at least one of communication partner information and image data; or the image processing apparatus has at least copy function, and the registration information includes at least image data. Therefore, it is possible to prevent leakage of confidential information such as information of communication partners and image data when, for example, the apparatus is picked up for recovery after expiration of service contract. Thus, an image processing apparatus that can be safely used by the user can be provided.

Preferably, the image processing apparatus further includes a generating unit generating and displaying specifying information for generating the cancellation information, based on the unique information and the changeable information.

According to another aspect, the present invention provides a management system including an image processing apparatus executing a process corresponding to a requested function and a management apparatus managing the image processing apparatus. The image processing apparatus includes: a first storage unit storing registration information registered for executing the function; a receiving unit receiving an instruction requesting erasure of the registration information stored in the first storage unit; an erasing unit, responsive to reception of the instruction by the receiving unit, for erasing the registration information stored in the first storage unit; a restricting unit, responsive to erasure of the registration information by the erasing unit, for restricting an operation of the image processing apparatus; a second storage unit storing unique information unique to the image processing apparatus and changeable information changed in response to the erasure of the registration information by the erasing unit; an input unit receiving an input of cancellation information for cancelling the operation restriction imposed by the restricting unit; a determining unit, responsive to the input unit receiving input of the cancellation information, for determining whether the received cancellation information is cancellation information corresponding to the unique information and the changeable information stored in the second storage unit; and a cancelling unit for cancelling, if the received cancellation information is determined to be the cancellation information corresponding to the unique information and the changeable information by the determining unit, the operation restriction imposed by the restricting unit. The management apparatus includes: an obtaining unit obtaining specifying information allowing specification of the unique information and the changeable information stored in the second storage unit; and an issuing unit issuing the cancellation information corresponding to the unique information and the changeable information, based on the specifying information obtained by the obtaining unit.

As described above, the cancellation information for cancelling the operation restriction of the image processing apparatus is issued in correspondence with the unique information unique to the image processing apparatus and the changeable information that is changed in response to erasure of the registration information. As a result, the cancellation information is set to be different every time the registration information is erased and, therefore, confidentiality of the cancellation information can be maintained. Consequently, it becomes possible to prevent unauthorized cancellation of the operation restriction of the image processing apparatus by a third party illegally getting past cancellation information and, therefore, an image processing apparatus enabling safe cancellation of operation restriction can be provided.

Further, in response to erasure of the registration information, the operation of image processing apparatus is restricted. Therefore, it is possible to prevent leakage of registration information when, for example, the apparatus is picked up for recovery after expiration of service contract. This prevents any trouble related to the sale of recovered image processing apparatus.

Preferably, the management apparatus further includes: a specifying unit specifying the unique information and the changeable information based on the specifying information obtained by the obtaining unit; and a third storage unit storing the unique information and the changeable information specified by the specifying unit. Therefore, the management apparatus can manage the unique information and the changeable information. As a result, it becomes possible to gasp the number of erasure of registration information and the number of cancellation of operation restriction of each image processing apparatus. Therefore, the state of apparatus including the degree of deterioration of components and units forming the apparatus can accurately be assessed. Further, it becomes possible both by the image processing apparatus and the management apparatus to manage the unique information and the changeable information. Thus, appropriate management of the image processing apparatus becomes possible.

According to a further aspect, the present invention provides a control method of controlling an image processing apparatus including a storage unit and an operation unit, executing a process corresponding to a requested function. The control method includes the steps of storing information input for executing the function as registration information in the storage unit; receiving an instruction requesting erasure of the registration information stored in the storage unit through the operation unit; erasing the registration information stored in the storage unit, in response to reception of the instruction; setting operation restriction of the image processing apparatus, in response to erasure of the registration information; storing unique information unique to the image processing apparatus and changeable information changed in response to erasure of the registration information in the storage unit; receiving an input of cancellation information for cancelling the operation restriction through the operation unit; determining, in response to reception of the input of the cancellation information, whether or not the received cancellation information is cancellation information corresponding to the unique information and the changeable information stored in the storage unit; and cancelling the operation restriction if the received cancellation information is determined to be the cancellation information corresponding to the unique information and the changeable information.

Preferably, the control method further includes the step of generating and displaying specifying information for generating the cancellation information, based on the unique information and the changeable information.

More preferably, the control method further includes the step of controlling a management apparatus managing the image processing apparatus, and the step of controlling the management apparatus includes the steps of obtaining specifying information allowing specification of the unique information and the changeable information stored in the storage unit, and issuing the cancellation information corresponding to the unique information and the changeable information, based on the obtained specifying information.

More preferably, the step of controlling the management apparatus further includes the steps of specifying the unique information and the changeable information based on the obtained specifying information, and storing the specified unique information and the changeable information in a storage unit of the management apparatus.

According to the present invention, if the input cancellation information is cancellation information corresponding to the unique information unique to the image processing apparatus and the changeable information that is changed in response to erasure of the registration information, the operation restriction of the apparatus is cancelled. Specifically, the cancellation information is set to be different every time the registration information is erased and, therefore, confidentiality of the cancellation information can be maintained. Consequently, it becomes possible to prevent unauthorized cancellation of the operation restriction of the image processing apparatus by a third party illegally getting past cancellation information and, therefore, an image processing apparatus enabling safe cancellation of operation restriction can be provided.

Further, in response to erasure of the registration information, the operation of image processing apparatus is restricted. Therefore, it is possible to prevent leakage of registration information when, for example, the apparatus is picked up for recovery after expiration of service contract. This prevents any trouble related to the sale of image processing apparatus.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 15 shows an example of a cancellation key input screen image.

FIG. 16 shows an example of a message box requesting restart of the image processing apparatus.

DESCRIPTION OF THE PREFERRED EMBODIMENTS

Figure 1:
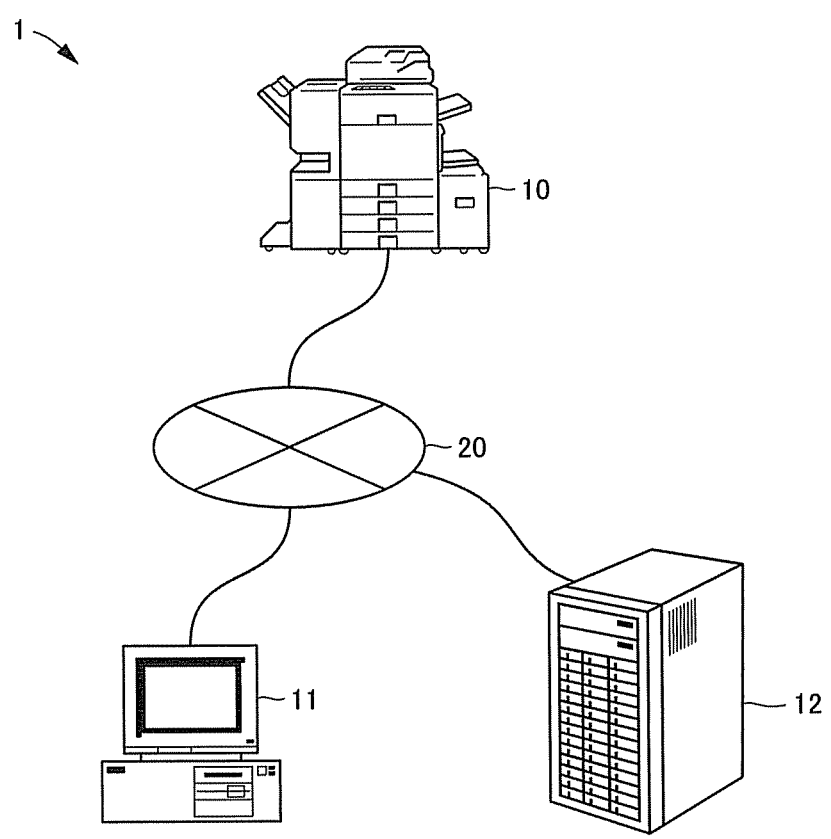
FIG. 1 shows a configuration of the management system in accordance with an embodiment of the present invention.

In the following description and in the drawings, the same components are denoted by the same reference characters and same names. Their functions are also the same. Therefore, detailed description thereof will not be repeated.

Referring to FIG. 1, a management system 1 in accordance with an embodiment of the present invention includes an image processing apparatus 10, a PC (Personal Computer) 11 and a management server 12. Image processing apparatus 10, PC 11 and management server 12 are connected to each other through a network 20 implemented, for example, of LAN (Local Area Network), and can transmit/receive various data to and from each other.

Image processing apparatus 10 is an MFP (Multifunction Peripheral) having scanner function, copy function, facsimile (hereinafter also denoted as "FAX") function and printer function. Image processing apparatus 10 executes a process corresponding to a function requested by the user, among the plurality of functions mentioned above. Though only one image processing apparatus 10 is shown in FIG. 1, actually, there may be a plurality of image processing apparatuses.

PC 11 is a terminal device operated by general users for using image processing apparatus 10. Though only one PC 11 is shown in FIG. 1, actually, there may be a plurality of PCs. When print data as an object of printing is transmitted from PC 11 to image processing apparatus 10, image processing apparatus 10 executes a print process of forming an image based on the print data.

Management server 12 is a server for collectively managing pieces of information related to at least one image processing apparatus 10. Management server 12 manages pieces of information related to maintenance of image processing apparatus 10, and pieces of information related to service contract between service operator and the manager of image processing apparatus 10 (such as the term of service contract).

<Hardware Configuration>

[Image Processing Apparatus 10]

Figure 2:
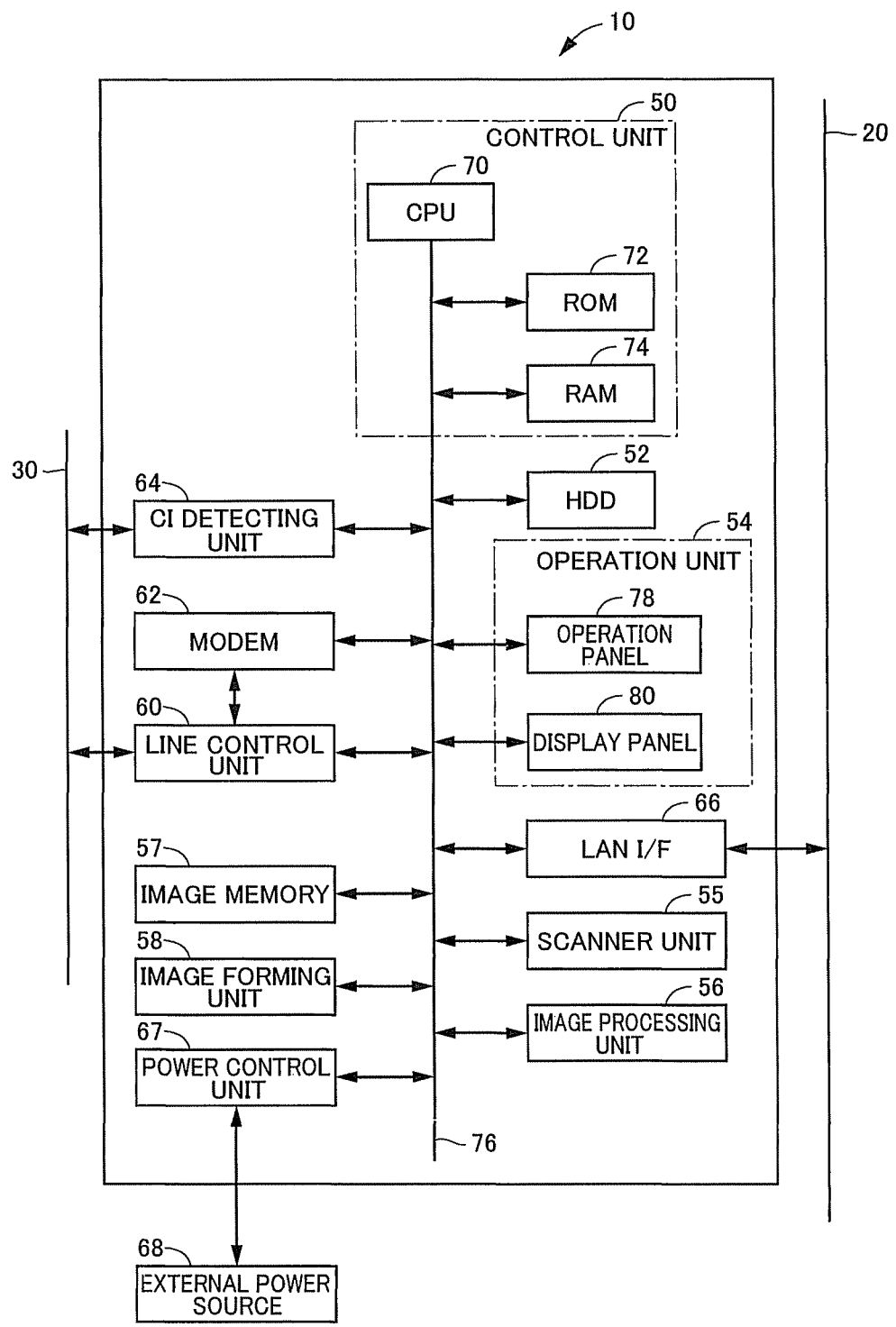
FIG. 2 is a block diagram showing a configuration of the image processing apparatus.

Referring to FIG. 2, image processing apparatus 10 includes a control unit 50, an HDD (Hard Disk Drive) 52, an operation unit 54, a scanner unit 55, an image processing unit 56, an image memory 57 and an image forming unit 58 forming a printer unit, a line control unit 60, a modem 62, a CI (Calling Indicator) detecting unit 64; an LAN interface (LAN I/F) 66 and a power control unit 67.

Control unit 50 is substantially a computer, including a CPU (Central Processing Unit) 70, an ROM (Read Only Memory) 72 and an RAM (Random Access Memory) 74. To CPU 70, a BUS line 76 is connected. To BUS line 76, ROM 72 and RAM 74 are electrically connected. CPU 70 executes various computer programs in accordance with instructions from operation unit 54 or the like, to execute operations of various units and components of image processing apparatus 10 and executes desired processes such as communication with management server 12. The various computer programs mentioned above are stored in ROM 72 or HDD 52 in advance, and when a desired process is to be executed, the program or programs are read from ROM 72 or HDD 52 and transferred to RAM 74. CPU 70 reads and interprets program instruction from an address in RAM 74 designated by a value stored in a register referred to as a program counter (not shown) in CPU 70. CPU 70 reads data necessary for operation from an address designated by the read instruction, and executes an operation corresponding to the instruction on the data. The result of execution is stored at the address designated by the instruction, in RAM 74, HDD 52, the register in CPU 70 and the like.

To BUS line 76, HDD 52, operation unit 54, scanner unit 55, image processing unit 56, image memory 57, image forming unit 58, line control unit 60, modem 62, CI detecting unit 64, LAN I/F 66 and power control unit 67 are further electrically connected.

HDD 52 includes a magnetic storage medium. HDD 52 stores image data and registration data registered at the place of installation of image processing apparatus 10, including FAX numbers and mail addresses of communication partners. These pieces of registration data are registered by an administrator of image processing apparatus 10 or a user different from the administrator, by an input operation or the like through operation unit 54, to execute a plurality of functions provided by the image processing apparatus 10.

HDD 52 further stores unique information unique to image processing apparatus 10 and changeable information that is changed in response to erasure of registration data. In the present embodiment, as the unique information, production number (serial number) and name (model name or the like) of the apparatus are stored. As the changeable information, the number of erasure of registration data by the administrator (hereinafter also simply referred to as "data erasure number") is stored.

HDD 52 stores in advance an equation for calculating a cancellation key issuing number, which will be described later, based on the unique information and the changeable information (data erasure number). HDD 52 stores in advance an equation for calculating the unique information and the changeable information (data erasure number) from the cancellation key, which will be described later.

HDD 52 stores, together with computer programs for realizing general operations of image processing apparatus 10, computer programs for realizing the registration data erasing process, operation lock determination process, operation locking process and resuming process, as will be described later.

Operation unit 54 includes an operation panel 78 provided with various hard keys. The various hard keys include ten keys, a power key, a start key, and a system setting key. The ten keys are for inputting set values and the like such as the FAX number of a communication partner and the number of copies. The power key is to instruct power on and power off. The start key is for instructing start of various jobs. The administrator can use functions such as registration of destinations such as FAX number and mail address of a communication partner, initial setting of time of a built-in timer, and initialization of image processing apparatus 10, by pressing the system setting key.

Operation unit 54 further includes a display panel 80 formed by superposing a touch-panel on a liquid crystal display (LCD). Display panel 80 provides an interactive operation interface with the user. Operation unit 54 receives a user instruction related to the overall operation of image processing apparatus 10, from various hard keys on operation panel 78 or the touch-panel of display panel 80. Operation unit 54 displays the contents of instruction on the LCD of display panel 80, and outputs a control signal in accordance with the instruction to control unit 50 or an MPU (Micro Processing Unit, not shown) of image processing unit 56.

Scanner unit 55 includes a document scanning unit including a light source, a reflection mirror, an optical lens and a CCD (Charge-Coupled Device) line sensor (all not shown). The document scanning unit irradiates an image-bearing surface of a document placed on a platen (not shown) manually or by an automatic document feeder (not shown) with light from the light source, and thereby obtains reflection light. The reflection mirror and the optical lens form an image of the obtained reflection light on the CCD line sensor. The CCD line sensor executes photo-electric conversion of the formed reflection light image successively, and outputs the result as image data to image processing unit 56.

Image processing unit 56 includes an MPU (not shown). Image processing unit 56 performs various processes including a prescribe image processing such as rasterization on the image data received from scanner unit 55, and thereby creates print data of a prescribed tone, which is output to image memory 57.

Image memory 57 includes an RAM, and temporarily stores print data page by page. Image memory 57 temporarily stores, page by page, print data input from image processing unit 56 or print data transmitted from an external device, to be transmitted to image forming unit 58, in accordance with an instruction, for example, from control unit 50. Image memory 57 outputs the stored print data to image forming unit 58, in synchronization with image formation by image forming unit 58. Image forming unit 58 includes a photoreceptor drum, a charger, an LSU (Laser Scanning Unit), a developer, a transfer device, a cleaning device and a fixing device (all not shown), as well as a toner cartridge detachably attached to image processing apparatus 10. Image forming unit 58 further includes a manual feed tray and first and second paper feed trays (all not shown) detachably attached to image processing apparatus 10. These paper feed trays are arranged from top to bottom in this order. These paper feed trays hold sheets of recording paper, and feed sheets of recording paper to a paper feeding unit (not shown). The manual feed tray is for allowing the user to manually set a desired sheet of recording paper. The first and second paper feed trays are to hold sheets of recording paper of different sizes. In response to an instruction from control unit 50 or the like, image forming unit 58 forms an image based on the print data transmitted from image memory 57, on the sheet of recording paper fed from any of the paper feed trays through the paper feeding unit.

Line control unit 60 is a hardware circuit providing an interface with a public telephone line network 30, which is an analog line. To public telephone line network 30, a plurality of external devices such as facsimile machines capable of facsimile communication with image processing apparatus 10 are connected. Line control unit 60 executes line control of opening and closing lines to public telephone line network 30 in accordance with an instruction from control unit 50, and connects modem 62 with public telephone line network 30 as needed. Line control unit 60 further transmits a dial signal corresponding to the FAX number of communication partner to the communication partner, in order to call the external device of the communication partner connected to public telephone line network 30.

Modem 62 includes a facsimile modem capable of facsimile communication, which is connected to public telephone line network 30 through line control unit 60. Modem 62 converts digital data to be transmitted to the communication partner to analog data, and transmits the data through line control unit 60 to public telephone line network 30. Further, modem 62 converts analog data received from the communication partner through line control unit 60 to digital data, and demodulates the same. The demodulated image data is decoded by a coding/decoding unit (not shown), and output to image memory 57.

CI detecting unit 64 detects a call signal (CI signal) from an external device connected to public telephone line network 30, and notifies control unit 50 of the result of detection. Determining that the CI signal has been detected for a prescribed time period, control unit 50 instructs line control unit 60 to connect to public telephone line network 30, to capture public telephone line network 30 through modem 62. When public telephone line network 30 is captured, facsimile communication through modem 62 starts.

LAN I/F 66 provides an interface with network 20. Image processing apparatus 10 is capable of data communication with various external devices on network 20 through LAN I/F 66, in accordance with prescribed communication protocol.

Power control unit 67 is electrically connected to external power source 68. Power control unit 67 obtains electric power necessary for operations of various units and components of image processing apparatus 10 from external power source 68, and supplies the obtained electric power to various units and components of image processing apparatus 10.

By the operations of various units described above, image processing apparatus 10 realizes any of the copy mode, printer mode and scanner mode in accordance with an instruction by an input operation by the user through operation unit 54 or an instruction from an external device. In the copy mode, image processing apparatus 10 reads a document image and prints the image, on a sheet of recording paper. In the printer mode, image processing apparatus 10 receives print data transmitted from an external device and prints the data on a sheet of recording paper. In the scanner mode, image processing apparatus 10 reads a document image and transmits the image to an external device.

[Management Server 12]

Figure 3:
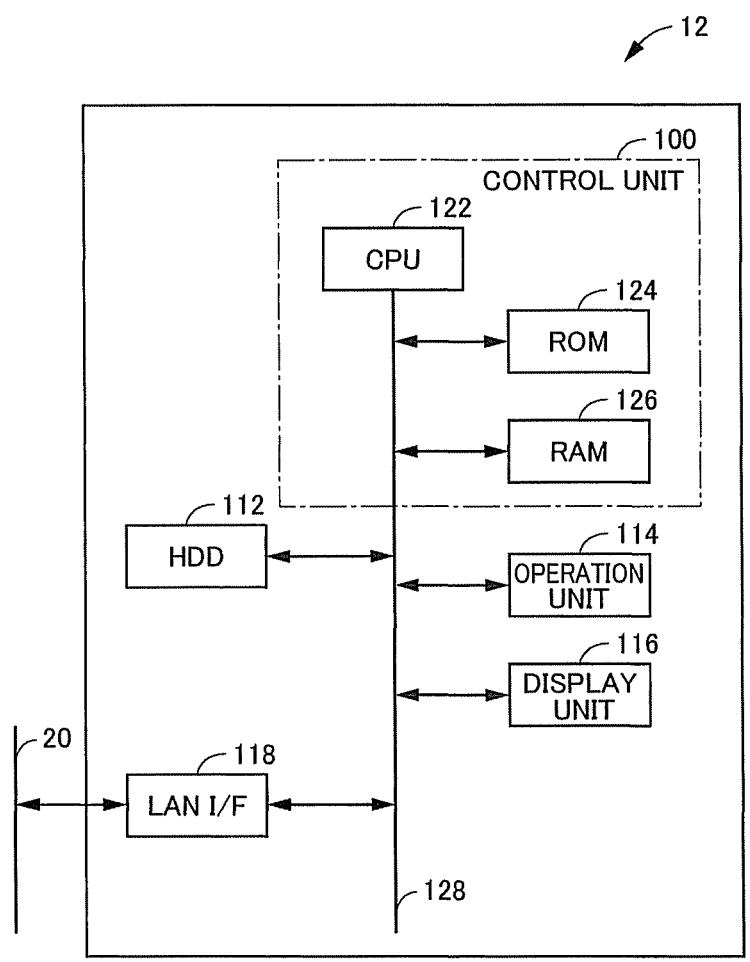
FIG. 3 is a block diagram showing a configuration of a management server.

Referring to FIG. 3, management server 12 includes a control unit 100, an HDD 112, an operation unit 114, a display unit 116 and an LAN I/F 118.

Control unit 100 is substantially a computer, and it includes a CPU 122, an ROM 124 and an RAM 126. To CPU 122, a BUS line 128 is electrically connected. To BUS line 128, ROM 124 and RAM 126 are electrically connected. CPU 122 executes various computer programs in accordance with instructions from external devices including image processing apparatus 10 or from operation unit 114, to execute operations of various units and components of management server 12 and desired processes such as communication with an external device. The various computer programs mentioned above are stored in ROM 124 or HDD 112 in advance, and when a desired process is to be executed, the program or programs are read from ROM 124 or HDD 112 and transferred to RAM 126. CPU 122 reads and interprets program instruction from an address in RAM 126 designated by a value stored in a register referred to as a program counter (not shown) in CPU 122. CPU 122 reads data necessary for operation from an address designated by the read instruction, and executes an operation corresponding to the instruction on the data. The result of execution is stored at the address designated by the instruction, in RAM 126, HDD 112, the register in CPU 122 and the like.

To BUS line 128, HDD 112, operation unit 114, display unit 116 and LAN I/F 118 are further electrically connected.

HDD 112 includes a magnetic recording medium and stores computer programs for realizing operations of management server 12. Further, HDD 112 stores in advance an equation for calculating the unique information and the changeable information (data erasure number) of image processing apparatus 10, from a cancellation key issuing number, which will be described later, input by an input operation of a service person to operation unit 114. Further, HDD 112 stores in advance an equation for calculating the cancellation key, which will be described later, based on the unique information and the changeable information calculated from the number for issuing the cancellation key, by a prescribed algorithm.

HDD 112 further stores the unique information and changeable information (data erasure number) of image processing apparatus 10 in association with each other. Therefore, it is possible for management server 12 to manage the unique information and the changeable information of each image processing apparatus 10. Specifically, every time the cancellation key issuing number is input by the input operation of service person to operation unit 114, control unit 100 rewrites the changeable information corresponding to the unique information, so that HDD 112 stores the latest changeable information.

Further, HDD 112 stores administrator information and information related to service contract, of image processing apparatus 10 in association with the unique information of image processing apparatus 10. Thus, it is possible for management server 12 to manage various pieces of information related to image processing apparatus 10, for each image processing apparatus 10.

Operation unit 114 is an input device including a keyboard and a pointing device such as a mouse, for various inputs and character inputs in accordance with a user instruction. Operation unit 114 is connected to BUS line 128 through an interface (not shown).

Display unit 116 is a display device implemented, for example, by a liquid crystal display, displaying, for example, the result of processing by management server 12. Display unit 116 is connected to BUS line 128 through a video circuit (not shown) driving display unit 116.

Management server 12 is connected to network 20 through LAN I/F 118, and capable of data communication with an external device connected to network 20.

A power source (not shown) is connected to various units and components of management server 12, and with electric power fed from the power source, various units and components of management server 12 operate.

<Software Configuration>

(Registration Data Erasure Process)

A program for realizing the registration data erasure process is activated when an enter button provided on an initialization screen image, which will be described later, is pressed.

Figure 4:
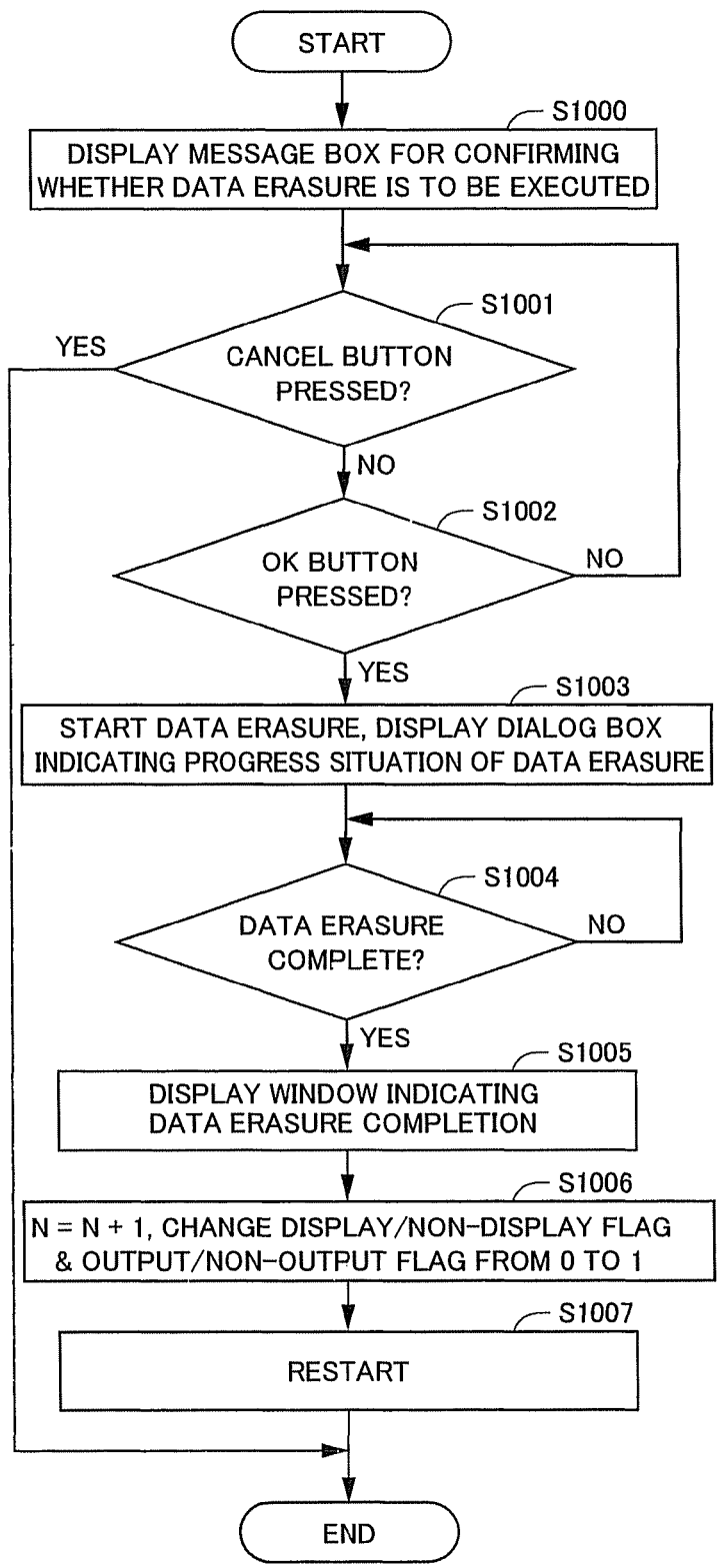
FIG. 4 is a flowchart representing a control structure of a computer program for realizing a registration data erasure process.

Referring to FIG. 4, the program includes steps S1000 to S1002. At step S1000, control unit 50 causes display panel 80 to display a message box for confirming the administrator whether or not erasure of registration data is to be executed. At step S1001, control unit 50 determines whether or not a cancel button provided in the message box is pressed. Step S1002 is executed if it is determined at step S1001 that the cancel button is not pressed (NO). At step S1002, control unit 50 determines whether or not an OK button provided in the message box is pressed. If it is determined at step S1001 that a cancel button is pressed (YES), the present control ends. If it is determined at step S1002 that the OK button is not pressed (NO), the control returns to step S1001.

The program further includes steps S1003 and S1004. Step S1003 is executed if it is determined at step S1002 that the OK button is pressed (YES). At step S1003, control unit 50 starts erasure of the registration data, and causes display panel 80 to display a dialog box for indicating the progress situation of registration data erasure. At step S1004, control unit 50 determines whether or not the erasure of registration data is completed. Control unit 50 waits until the erasure of registration data is completed, by repeating step S1004.

The program further includes a step S1005. Step S1005 is executed if it is determined at step S1004 that the erasure of registration data is completed (YES). At step S1005, control unit 50 causes display panel 80 to display a window indicating completion of the erasure of registration data.

The program further includes a step S1006. At step S1006, control unit 50 increases a variable N by 1, and changes the values of display/non-display flag and output/non-output flag from 0 to 1. The variable N represents the number of erasure of registration data, which is stored in a counter (not shown). The display/non-display flag indicates whether or not a window indicating completion of the erasure of registration data is to be displayed. When the value of display/non-display flag is set to 1, the window is displayed (set to display-on). The output/non-output flag indicates whether or not a data erasure completion notice, which will be described later, is to be output. When the value of output/non-output flag is set to 1, the notice is output (set to output-on).

The program further includes a step S1007. At step S1007, control unit 50 causes power control unit 67 to once turn off and then turn on the power source (hereinafter referred to as off-and-on), so as to restart the image processing apparatus 10.

(Operation Lock Determination Process)

A program for realizing the operation lock determination process is activated when image processing apparatus 10 is powered on.

Figure 5:
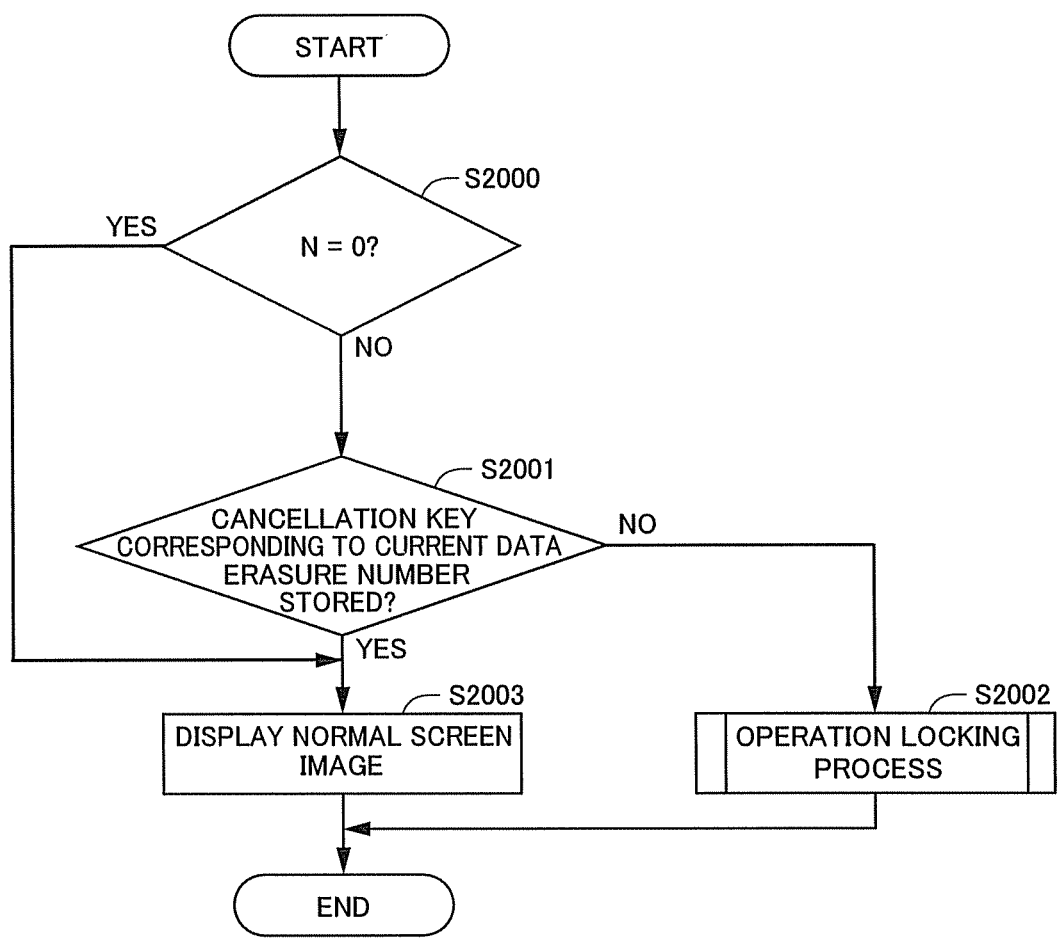
FIG. 5 is a flowchart representing a control structure of a computer program for realizing an operation lock determination process.

Referring to FIG. 5, the program includes steps S2000 to S2002. At step S2000, control unit 50 determines whether or not the variable N is 0. Step S2001 is executed if it is determined at step S2000 that the variable N is not 0 (NO). At step S2001, control unit 50 determines whether or not a cancellation key corresponding to the current (that is, the latest) changeable information (data erasure number) is stored in HDD 52. Step S2002 is executed if it is determined at step S2001 that the corresponding cancellation key is not stored (NO). At step S2002, control unit 50 executes the operation locking process, which will be described later.

The program further includes a step S2003. Step S2003 is executed if it is determined at step S2000 that the variable N is 0 (YES), or if it is determined at step S2001 that the corresponding cancellation key is stored (YES). At step S2003, control unit 50 causes display panel 80 to display the normal screen image.

(Operation Locking Process)

Figure 6:
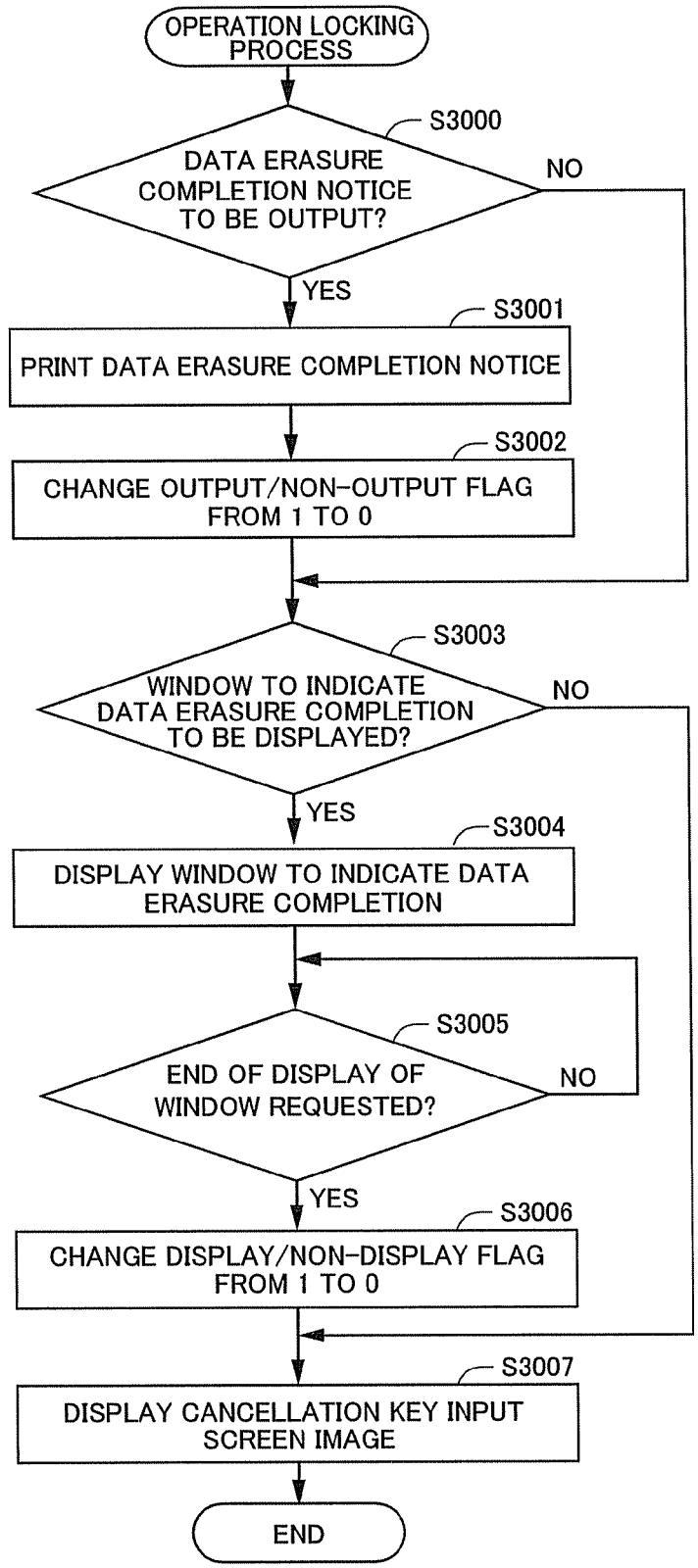
FIG. 6 is a flowchart representing a control structure of a computer program for realizing an operation locking process.

Referring to FIG. 6, the program for realizing the operation locking process includes steps S3000 to S3002. At step S3000, control unit 50 determines whether or not the data erasure completion notice, which will be described later, is to be output, based on the value of output/non-output flag. Step S3001 is executed if it is determined at step S3000 that the notice is to be output (YES). At step S3001, control unit 50 causes image memory 57 and image forming unit 58 to print the data erasure completion notice. At step S3002, control unit 50 sets output-off, by changing the value of output/non-output flag from 1 to 0.

The program further includes steps S3003 and S3004. Step S3003 is executed if it is determined at step S3000 that the notice is not to be output (NO), or after the process of step S3002. At step S3003, control unit 50 determines whether or not the window indicating completion of the erasure of registration data is to be displayed, based on the value of display/non-display flag. Step S3004 is executed if it is determined at step S3003 that the window is to be displayed (YES). At step S3004, control unit 50 causes display panel 80 to display the window indicating completion of the erasure of registration data.

The program further includes steps S3005 and S3006. At step S3005, control unit 50 determines whether or not end of display of the window indicating completion of the erasure of registration data is requested by an input operation from operation unit 54. Control unit 50 waits until the end of display is requested, by repeating step S3005. Step S3006 is executed if it is determined at step S3005 that the end of display is requested (YES). At step S3006, control unit 50 sets the display off, by changing the value of display/non-display flag from 1 to 0.

The program further includes step S3007. Step S3007 is executed if it is determined at step S3003 that the window indicating completion of the erasure of registration data is not to be displayed (NO), or after the process of step S3006. At step S3007, control unit 50 causes display panel 80 to display a cancellation key input screen image requesting input of a cancellation key, for cancelling the operation lock.

(Resuming Process)

The program for realizing the resuming process is activated when the cancellation key input screen image mentioned above is displayed on display panel 80.

Figure 7:
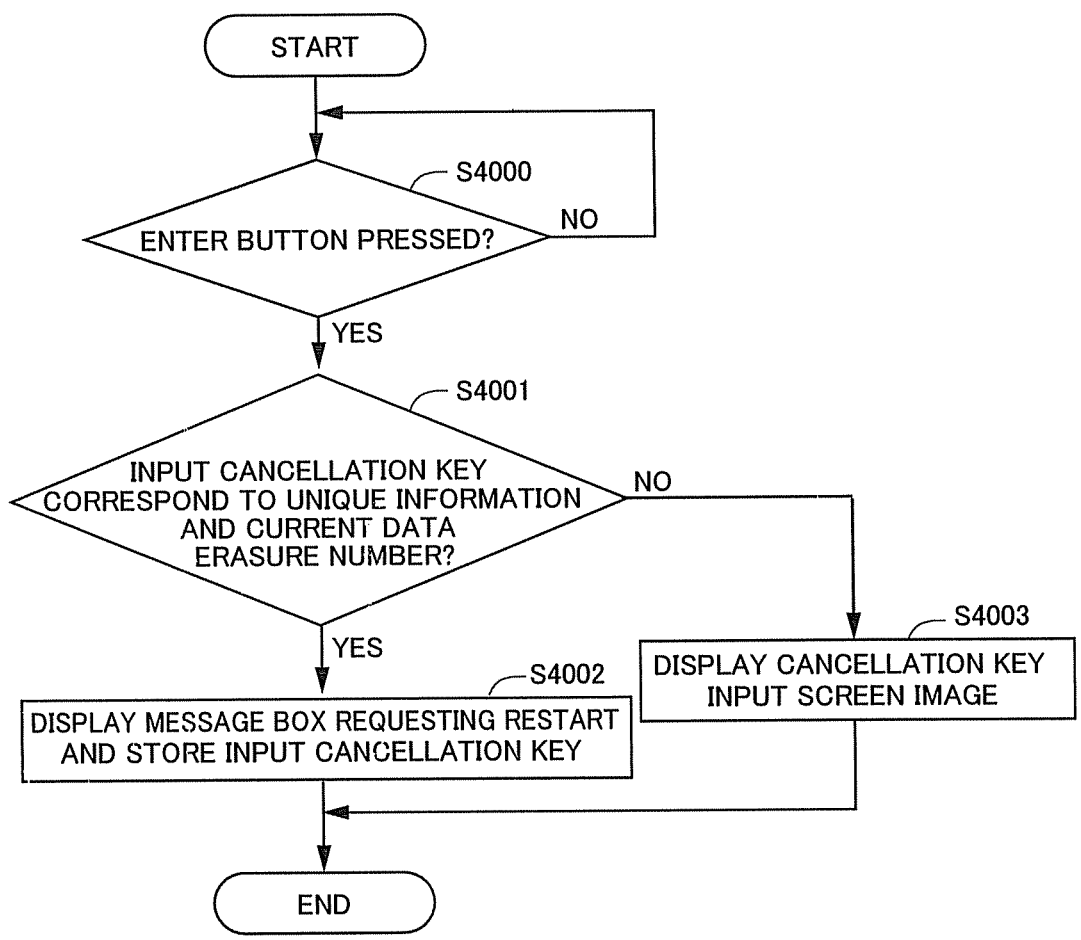
FIG. 7 is a flowchart representing a control structure of a computer program for realizing a resuming process.
Figure 8:
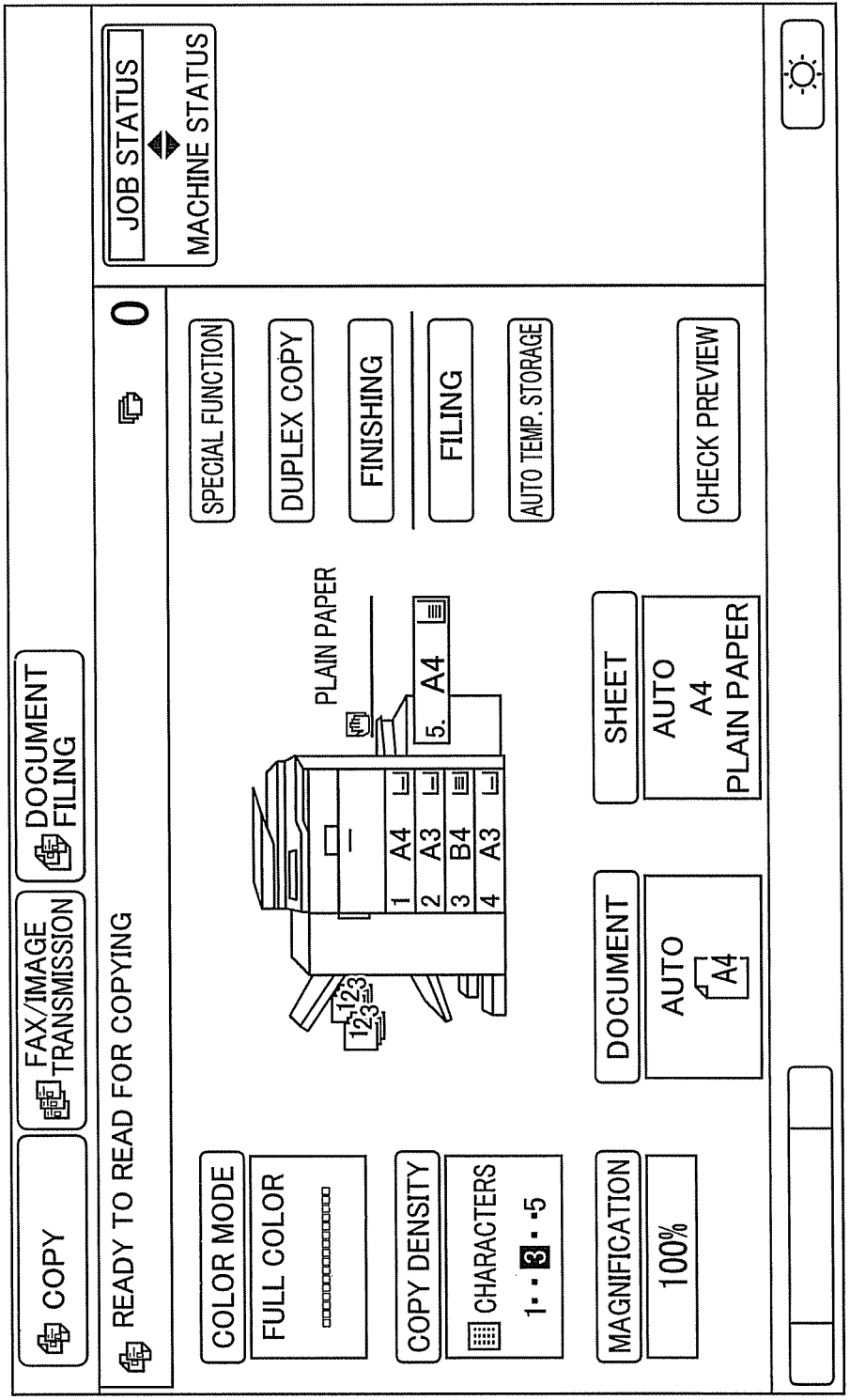
FIG. 8 shows an example of a normal screen image.

Referring to FIG. 7, the program includes steps S4000 and S4001. At step S4000, control unit 50 waits until an enter button provided in the cancellation key input screen image is pressed. Step S4001 is executed if it is determined at step S4000 that the enter button is pressed (YES). At step S4001, control unit 50 determines whether or not the cancellation key input to a text field of cancellation key input screen image corresponds to the unique information and the current (that is, the latest) changeable information (data erasure number).

The program further includes a step S4002. Step S4002 is executed if it is determined at step S4001 that the key is the corresponding cancellation key (YES). At step S4002, control unit 50 causes display panel 80 to display a message box requesting restart of image processing apparatus 10, and causes HDD 52 to store the input cancellation key.

The program further includes a step S4003. Step S4003 is executed if it is determined at step S4001 that the key is not a corresponding cancellation key (NO). At step S4003, the cancellation key input screen image is again displayed on display panel 80, so as to request re-entering of the cancellation code.

<Operation>

Referring to FIGS. 1 to 16, image processing apparatus 10 and management server 12 in accordance with the present embodiment operate in the following manner. Operations for realizing general functions of image processing apparatus 10 and management server 12 except for the operations described below are the same as those of the conventional image forming apparatus, and management server. In the following, it is assumed that when image processing apparatus 10 is powered on (ON), the operation lock of image processing apparatus 10 is in the cancelled state. Here, "operation lock" refers to a state in which operations of various units of image processing apparatus 10 are restricted, as an input operation from operation unit 54 is inhibited. It is also assumed that image processing apparatus 10 is in a state immediately after shipping, and the data erasure number at present of image processing apparatus 10 is 0 (N=0). It is assumed that management server 12 is always powered-on.

An administrator of image processing apparatus 10 who wishes to have image processing apparatus 10 recovered first turns on the power of image processing apparatus 10. When the power is turned on, control unit 50 determines that the variable N is 0 (YES at step S2000). Consequently, on display panel 80 of operation unit 54, normal screen image 1000 (see FIG. 8) for giving instructions to make transitions to various modes and allowing various settings in the copy mode is displayed (step S2003). The administrator presses a system setting key (not shown), which is a hardware key on operation panel 78. When the system setting key is pressed, a system setting screen image (not shown) is displayed on display panel 80. The administrator makes input operations to the system setting screen image, inputs an administrator password and issues a request for displaying a security setting screen image 2000 (see FIG. 9).

Figure 9:
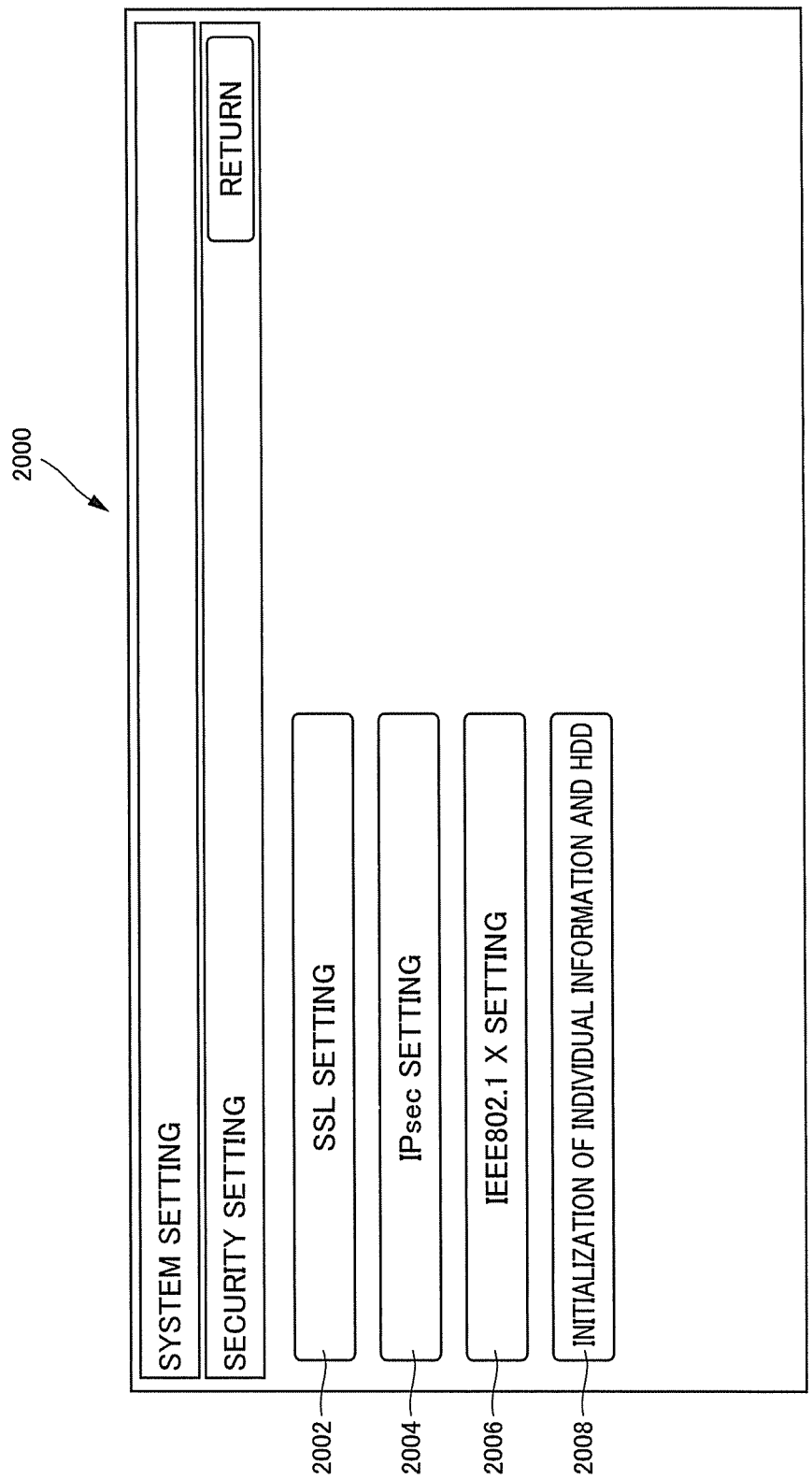
FIG. 9 shows an example of a security setting screen image.

When the instruction mentioned above is given, security setting screen image 2000 is displayed on display panel 80. Referring to FIG. 9, security setting screen image 2000 includes selection buttons 2002 to 2008. Selection button 2002 is for selecting SSL (Secure Sockets Layer) setting. Selection button 2004 is for selecting IPsec (Security Architecture for Internet Protocol). Selection button 2006 is for selecting IEEE (The Institute of Electrical and Electronics Engineers, Inc.) 802.1x. Selection button 2008 is for selecting initialization of individual information and initialization of hard disk (hereinafter also simply referred to as "initialization").

Figure 10:
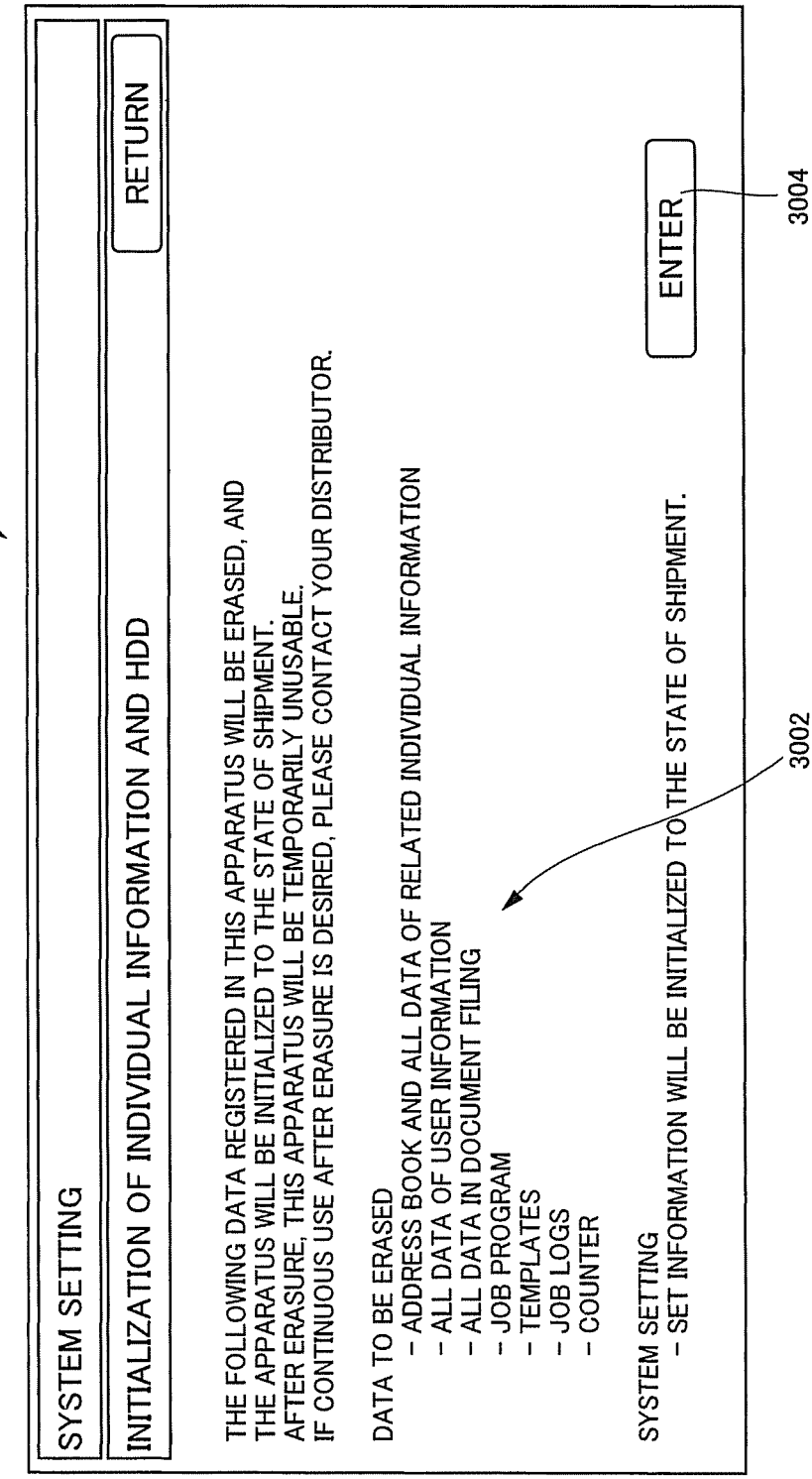
FIG. 10 shows an example of an initialization screen image.

The administrator confirms the security setting screen image 2000 and presses selection button 2008. When selection button 2008 is pressed, an initialization screen image 3000 for executing initialization of individual information and of the hard disk is displayed on display panel 80. Referring to FIG. 10, initialization screen image 3000 includes a description 3002 representing the contents of process executed by the initialization, and an enter button 3004 to instruct execution of the initialization.

The administrator confirms initialization screen image 3000 and presses enter button 3004.

(Registration Data Erasure Process)

Figure 11:
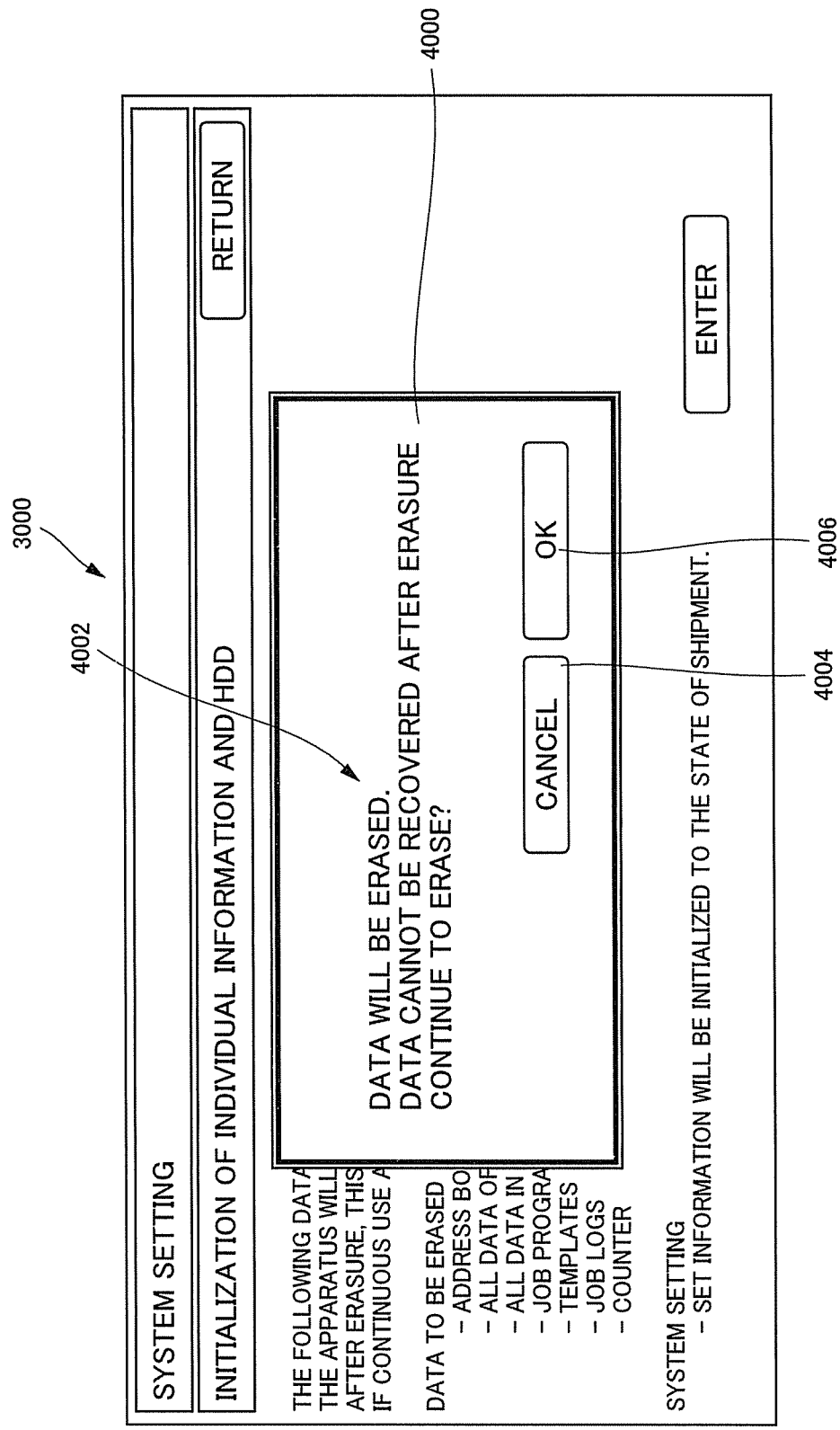
FIG. 11 shows an example of a message box confirming whether erasure of registration data is to be executed or not.

When enter button 3004 is pressed, a message box 4000 confirming the administrator whether or not erasure of registration data is to be executed (see FIG. 11) is displayed on display panel 80 (step S1000). Referring to FIG. 11, message box 4000 is displayed in front of initialization screen image 3000. Message box 4000 includes a message 4002, a cancel button 4004 and an OK button 4006. Message 4002 asks the administrator whether or not erasure of registration data is to be executed. Cancel button 4004 is to cancel the registration data erasure. OK button 4006 is to execute erasure of registration data.

Figure 12:
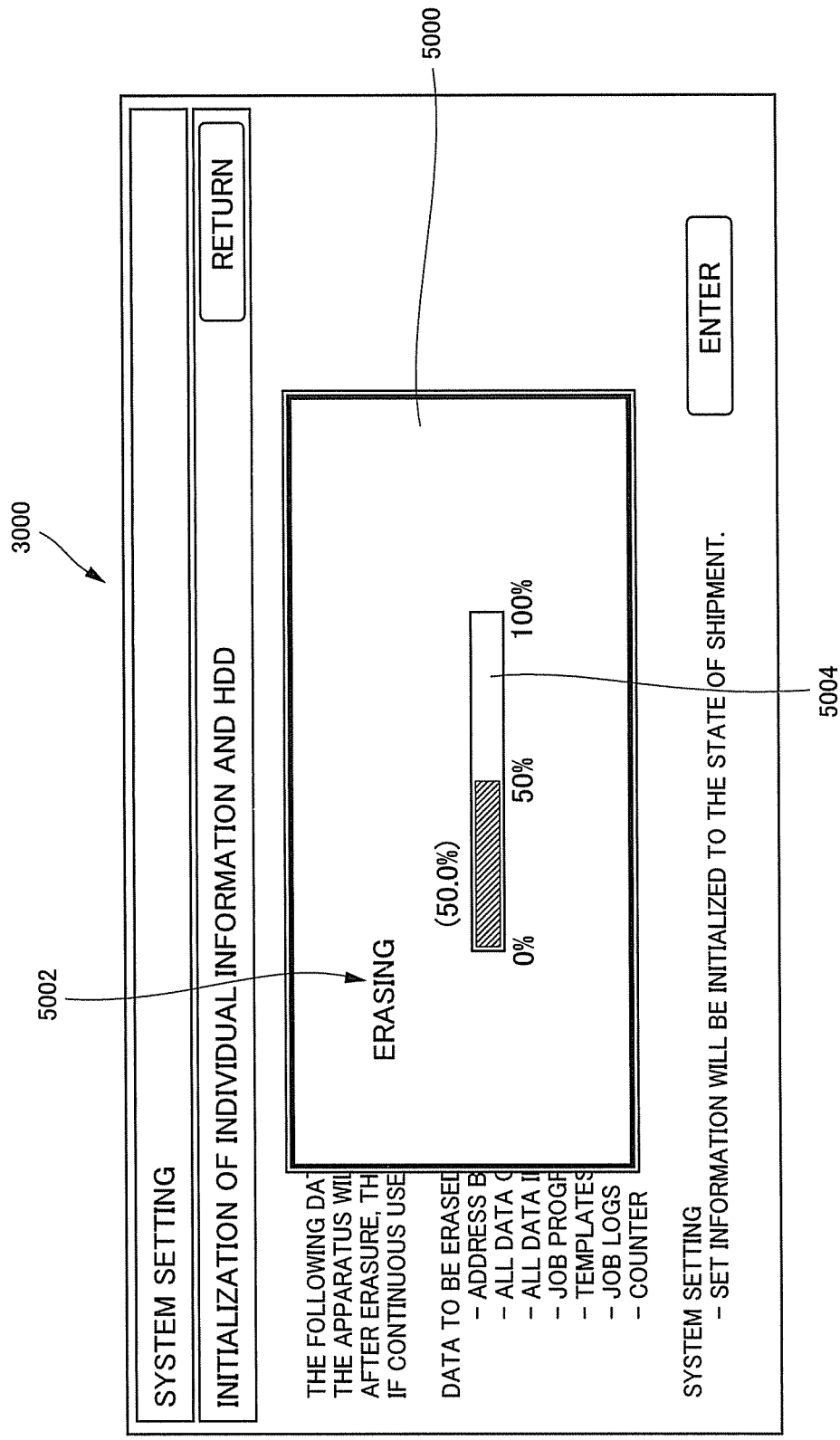
FIG. 12 shows an example of a dialog box representing progress situation of registration data erasure.

The administrator checks message box 4000, and presses OK button 4006. If OK button 4006 is pressed (NO at step S1001, and YES at step S1002), control unit 50 starts erasure of the registration data that has been stored in HDD 52. In synchronization with the start of registration data erasure, display panel 80 displays a dialog box 5000 (see FIG. 12) indicating the progress situation of registration data erasure (step S1003). Referring to FIG. 12, dialog box 5000 is displayed in front of initialization screen image 3000. Dialog box 5000 includes a message 5002 indicating that erasure of registration data is being executed, and a progress bar 5004 indicating the progress situation of the registration data erasure.

Figure 13:
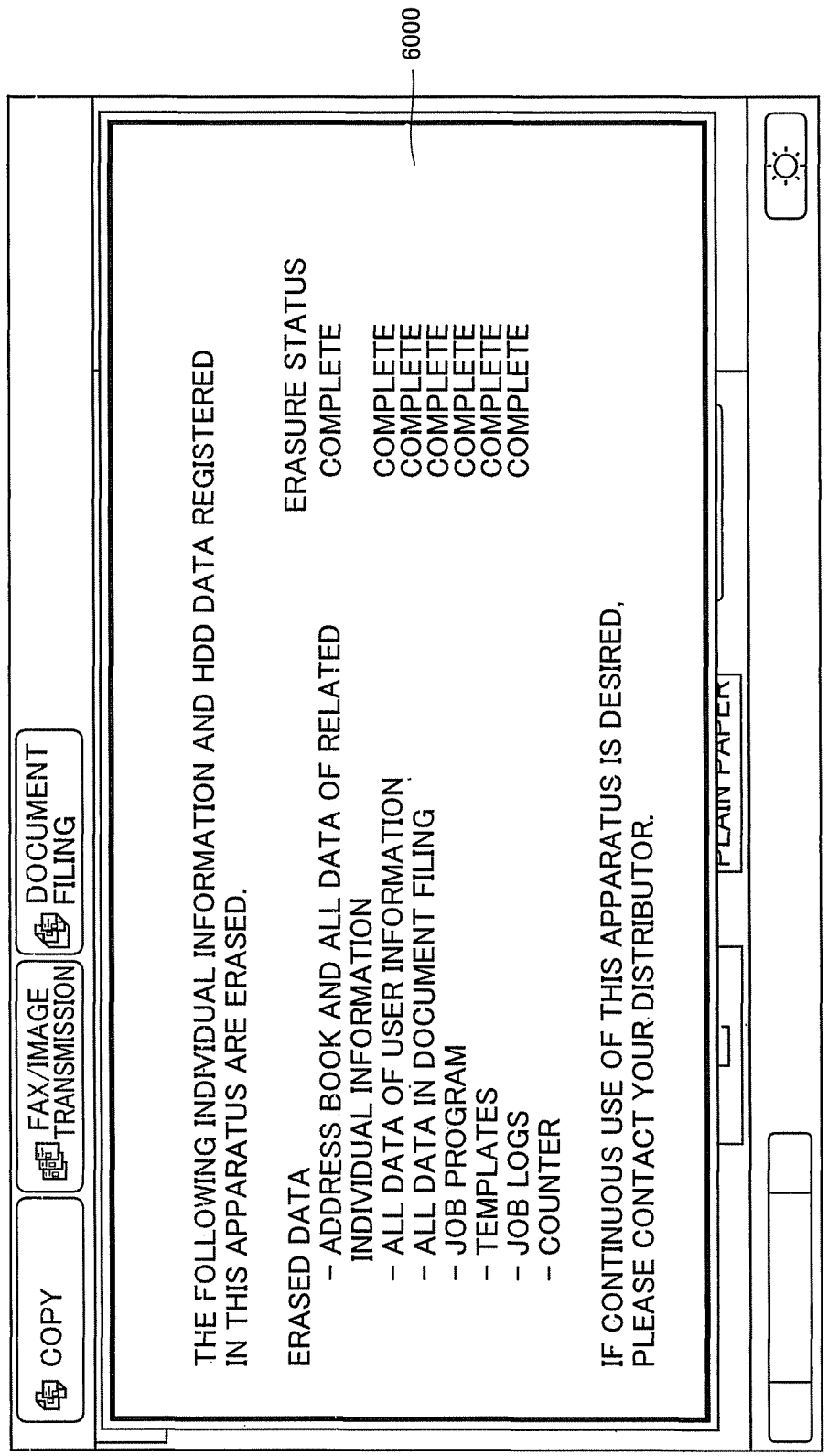
FIG. 13 shows an example of a window indicating completion of registration data erasure.

When the progress bar 5004 shows 100% complete and the erasure of registration data by control unit 50 is completed (YES at step S1004), display panel 80 displays a window 6000 (see FIG. 13) indicating that the erasure of registration data is completed (step S1005). Referring to FIG. 13, on window 6000, a message notifying that the erasure of registration data has been completed, the data as the object of erasure and the status of erasure are displayed. In the present embodiment, when window 6000 is displayed, any input operation to operation unit 54 except for the input operation on power key is inhibited, and the apparatus is set to the operation locked state.

When window 6000 is displayed, control unit 50 increments the variable N stored in a counter (not shown) by 1, and changes the value of display/non-display flag indicating whether or not window 6000 is to be displayed from 0 to 1. Thus, display-on is set (step S1006). Control unit 50 further changes the value of output/non-output flag indicating whether or not the data erasure completion notice is to be output from 0 to 1. Thus, output-on is set (step S1006).

After the variable N is incremented and the values of display/non-display flag and output/non-output flag are changed, control unit 50 causes power control unit 67 to turn off-and-on of the power source, to restart image processing apparatus 10 (step S1007).

If cancel button 4004 in message box 4000 is pressed by the administrator (YES at step S1001), initialization screen image 3000 is again displayed on display panel 80.

(Operation Lock Determination Process)

When image processing apparatus 10 is restarted, control unit 50 determines that the variable N is not 0 (NO at step S2000), determines that the cancellation key corresponding to the current data erasure number (variable N=1) is not stored in HDD 52 (NO at step S2001), and executes the operation locking process as will be described in the following (step S2002).

(Operation Locking Process)

Figure 14:
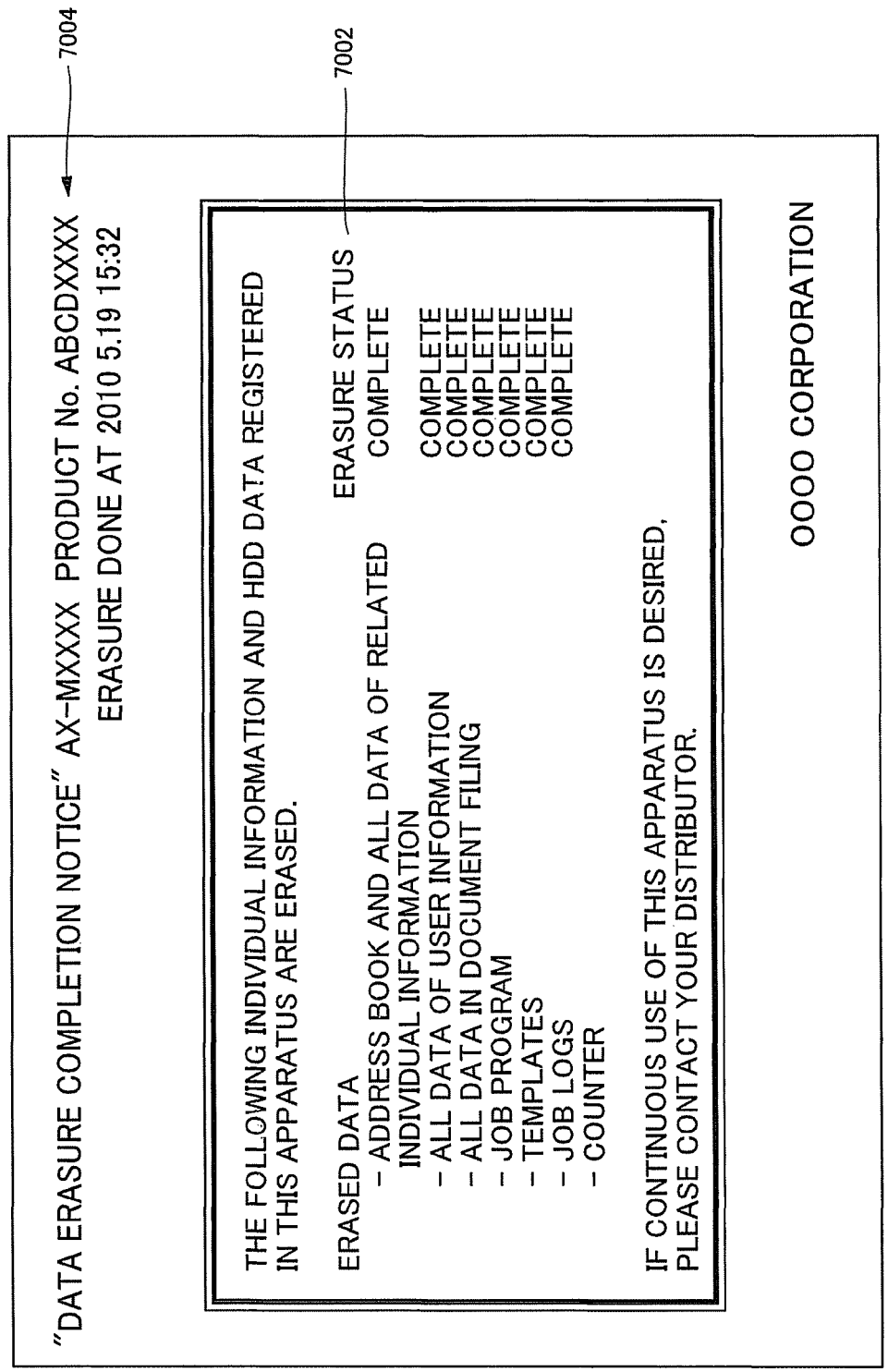
FIG. 14 shows an example of a data erasure complete notice.

Based on the value of output/non-output flag (here, set to 1), control unit 50 determines that the data erasure completion notice is to be output (YES at step S3000), and causes image memory 57 and image forming unit 58 to print data erasure completion notice 7000 (see FIG. 14) (step S3001). Referring to FIG. 14, data erasure completion notice 7000 records all pieces of information 7002 shown in window 6000 (see FIG. 13) and, in addition, pieces of information indicating model name, product number and date and time of completion of registration data erasure. After printing data erasure completion notice 7000, control unit 50 changes the value of output/non-output flag from 1 to 0. Thus, output-off is set (step S3002).

Further, control unit 50 determines that window 6000 (see FIG. 13) is to be displayed, based on the value of display/non-display flag (here, set to 1). When this determination is made by control unit 50 (YES at step S3003), display panel 80 displays window 6000 (step S3004).

Display of window 6000 is maintained (NO at step S3005) until end of display of window 6000 is requested by an input operation from operation unit 54. At this time, image processing apparatus 10 is kept in a state in which any input operation to operation unit 54 is inhibited, that is, in the operation locked state.

Confirming that the administrator obtained data erasure completion notice 7000, a service person of the service contractor is ready to pick up and recover the image processing apparatus 10 to a service facility. When the recovered image processing apparatus 10 is to be sold, for example, and image processing apparatus 10 is to be operated normally again, a cancellation key for cancelling the operation lock is necessary. Therefore, the service person issues a request to end the display of window 6000, by an input operation through operation unit 54.

If end of display of window 6000 is requested (YES at step S3005), control unit 50 changes the value of display/non-display flag from 1 to 0. Thus, display-off is set (step S3006). Display panel 80 displays a cancellation key input screen image 8000 (see FIG. 15) requesting input of a cancellation key (security cancellation code) for cancelling the operation lock (step S3007). Referring to FIG. 15, cancellation key input screen image 8000 includes a cancellation key issuing number 8002, a text field 8004 and an enter button 8006. Text field 8004 is for inputting the cancellation key. Enter button 8006 is for instructing execution of operation lock cancellation. Cancellation key issuing number 8002 is calculated in accordance with a prescribed equation stored in HDD 52, based on the unique information (production number and model name) and the changeable information (data erasure number) of image processing apparatus 10. In the present embodiment, when cancellation key input screen image 8000 is displayed, any input operation to operation unit 54 is inhibited, except for the input operation of power key, enter button 8006 and the key (for example, ten keys) for inputting the cancellation key.

After storing cancellation key issuing number 8002, the service person turns off the power of image processing apparatus 10 and picks up image processing apparatus 10.

When image processing apparatus 10 is to be sold, the service person obtains the cancellation key from management server 12 in the following manner. Specifically, the service person first inputs the stored cancellation key issuing number 8002, by an input operation on operation unit 114 of management server 12. Control unit 100 of management server 12 calculates the unique information and changeable information of image processing apparatus 10 based on the input cancellation key issuing number 8002, in accordance with a prescribed equation stored in HDD 112. Then, in accordance with an equation of a prescribed algorithm stored in HDD 112 and based on the calculated unique information and the changeable information, control unit 100 calculates the cancellation key corresponding to the calculated unique information and the changeable information. Control unit 100 issues (presents) the calculated cancellation key to the service person. Further, based on the unique information and the changeable information calculated from cancellation key issuing number 8002, control unit 100 rewrites the changeable information corresponding to the unique information. In this manner, management server 12 can obtain pieces of information to be managed from input cancellation key issuing number 8002. Thus, management of unique information and changeable information becomes easier.

After obtaining the cancellation key issued by management server 12, the service person turns on the power of image processing apparatus 10.

(Operation Lock Determination Process)

When the power of image processing apparatus 10 is turned on, control unit 50 determines that the variable N is not 0 (NO at step S2000). Control unit 50 determines that the cancellation key corresponding to the current data erasure number (variable N=1) is not stored in HDD 52 (NO at step S2001), and executes the following operation locking process (step S2002).

(Operation Locking Process)

Control unit 50 determines that data erasure completion notice 7000 (see FIG. 14) is not to be output, based on the value of output/non-output flag (here, set to 0) (NO at step S3000). Here, printing of data erasure completion notice 7000 is not executed.

Further, control unit 50 determines that window 6000 (see FIG. 13) is not to be displayed, based on the value of display/non-display flag (here, set to 0) (NO at step S3003). Here, window 6000 is not displayed on display panel 80.

When determinations as above are made by control unit 50, display panel 80 displays a cancellation key input screen image 8000 (see FIG. 15) (step S3007). The service person inputs the cancellation key obtained from management server 12 to text field 8004 of cancellation key input screen image 8000, and presses enter button 8006.

(Resuming Operation)

When enter button 8006 is pressed (YES at step S4000), control unit 50 determines whether the cancellation key input to text field 8004 is a cancellation key corresponding to the unique information and the current changeable information (data erasure number) (step S4001). At step S4001, control unit 50 determines that the input cancellation key is the cancellation key corresponding to the current changeable information (data erasure number), if the unique information and the changeable information (data erasure number) calculated from the input cancellation key match the unique information and the changeable information stored in HDD 52. If the determination above is made by control unit 50 (YES at step S4001), display panel 80 displays a message box 9000 (see FIG. 16) requesting restart of image processing apparatus 10, and the input cancellation key is stored in HDD 52 (step S4002). In the present embodiment, while message box 9000 is displayed, any input operation to operation unit 54 except for the input operation to power key is inhibited, and the apparatus is set to the operation locked state.

Referring to FIG. 16, message box 9000 is displayed in front of cancellation key input screen image 8000. Message box 9000 includes a message 9002 requesting restart of image processing apparatus 10.

If the unique information and changeable information calculated from cancellation key do not match the unique information and changeable information stored in HDD 52 and it is determined by control unit 50 that the cancellation key input to text field 8004 is not the corresponding cancellation key (NO at step 4001), display panel 80 again displays cancellation key input screen image 8000 and requests input of cancellation code again (step S4003).

The service person confirms message box 9000, once turns off and thereafter turns on the power of image processing apparatus 10, to restart image processing apparatus 10.

(Operation Lock Determination Process)

When image processing apparatus 10 is powered on, control unit 50 determines that the variable N is not 0 (NO at step S2000), and determines that the cancellation key corresponding to the current changeable information (data erasure number (variable N=1)) is stored in HDD 52. When the determination above is made by control unit 50 (YES at step S2001), operation lock of image processing apparatus 10 does not take place, and display panel 80 displays the normal screen image 1000 (see FIG. 8) (step S2003). Thus, processes corresponding to various modes executable in image processing apparatus 10 become available.

<Function/Effect>

According to the embodiment described above, in image processing apparatus 10 executing a process corresponding to a requested function, HDD 52 stores registration data registered for executing the above-described function. Operation unit 54 receives an instruction requesting erasure of the registration data stored in HDD 52. In response to the instruction received by operation unit 54, control unit 50 erases the registration data stored in HDD 52, and in response to the erasure of registration data, restricts operations of image processing apparatus 10. Further, HDD 52 stores the unique information unique to image processing apparatus 10 and the changeable information that is changed in response to the erasure of registration data. Operation unit 54 receives an input of a cancellation key for cancelling the operation restriction. In response to operation unit 54 receiving the input of cancellation key, control unit 50 determines whether or not the received cancellation key is the cancellation key corresponding to the unique information and the changeable information stored in HDD 52, and if the received cancellation key is determined to be the cancellation key corresponding to the unique information and the changeable information, it cancels the operation restriction of image processing apparatus 10.

Further, according to the embodiment above, management system 1 includes image processing apparatus 10 and management server 12 as described above. In management server 12, operation unit 114 obtains a cancellation key issuing number that can specify the unique information and the changeable information stored in HDD 52. Control unit 100 issues the cancellation key corresponding to the unique information and the changeable information based on the cancellation key issuing number obtained by operation unit 114.

As described above, if the input cancellation key is the cancellation key corresponding to the unique information unique to the image processing apparatus 10 and the changeable information that is changed in response to erasure of registration data, the operation restriction of image processing apparatus 10 is cancelled. Further, in management server 12, the cancellation key is issued to correspond to the unique information and the changeable information. As a result, the cancellation key is set differently every time the registration data is erased and, therefore, confidentiality of the cancellation key can be maintained. Consequently, it becomes possible to prevent unauthorized cancellation of the operation restriction of the image processing apparatus by a third party illegally getting past cancellation information and, therefore, an image processing apparatus 10 enabling safe cancellation of operation restriction can be provided.

Further, since the operations of image processing apparatus 10 are restricted in response to the erasure of registration data, leakage of registration data can be prevented when, for example, the apparatus is picked up for recovery after the expiration of service contract. This prevents any trouble related to the sale of the apparatus after recovery.

Further, according to the embodiment described above, the changeable information is the number of erasure of registration data by control unit 50. Therefore, the cancellation key can be set differently every time the registration data is erased, more easily with higher reliability. As a result, confidentiality of the cancellation key can be maintained more easily with higher reliability.

The changeable information may be any information that is changed in response to the erasure of registration data, and it is not limited to the number of data erasure described above. By way of example, it may be the number of cancellation of the operation restriction by control unit 50, date and time of data erasure or cancellation of operation restriction, or length of a period from the last erasure of registration data to the present erasure (length of service contract), or it may be the number of issuance of the cancellation key.

Further, according to the embodiment above, image processing apparatus 10 has the scanner function, copy function, image data transmitting/receiving function (for example, FAX function) and the printer function, and the registration data includes communication partner information and image data. Therefore, it is possible to prevent leakage of confidential information such as the communication partner information and the image information when, for example, the apparatus is picked up for recovery after expiration of service contract. Thus, an image processing apparatus that can be safely used by the user can be provided. The function provided by image processing apparatus 10 is not limited to the plurality of functions mentioned above, and it may only have the scanner function and copy function. Further, the registration data is not restricted to the pieces of information mentioned above, and it may contain only the communication partner information or the image data.

Further, according to the embodiment above, in management server 12, control unit 100 specifies the unique information and the changeable information based on the cancellation key issuing number obtained by operation unit 114. HDD 112 stores the specified unique information and changeable information. Consequently, it becomes possible for management server 12 to manage the unique information and the changeable information. As a result, it becomes possible to grasp the number of registration data erasure and the number of cancellation of operation restriction of each image processing apparatus 10. Therefore, the state of apparatus including the degree of deterioration of components and units forming image processing apparatus 10 can accurately be assessed. Further, it becomes possible both by image processing apparatus 10 and management server 12 to manage the unique information and the changeable information. Thus, appropriate management of image processing apparatus 10 becomes possible.

According to the embodiment above, HDD 112 of management server 12 stores the unique information and the changeable information. It is not always necessary to store the changeable information. In that case, management server 12 simply issues the cancellation key based on the unique information and the changeable information calculated from the cancellation key issuing number.

Further, according to the embodiment above, control unit 100 of management server 12 calculates the unique information and changeable information based on the cancellation key issuing number and issues the cancellation key based on the calculated unique information and changeable information. The present invention, however, is not limited to such an embodiment. By way of example, the unique information and the changeable information may not be calculated, and the cancellation key may be directly calculated in accordance with a prescribed algorithm based on the cancellation key issuing number. In that case, control unit 50 of image processing apparatus 10 calculates the cancellation key using the same algorithm as used by management server 12 based on the cancellation key issuing number issued by itself, and determines whether the calculated cancellation key matches the input cancellation key.

Further, in the embodiment above, image processing apparatus 10 issues the cancellation key issuing number. The present invention, however, is not limited to such an embodiment. By way of example, in place of the cancellation key issuing number, the unique information and the changeable information stored in HDD 52 may be issued. In that case, the unique information and the changeable information are input to management server 12 in place of the cancellation key issuing number, and based on the input information, the cancellation key is calculated and issued.

In the embodiment above, management server 12 obtains the unique information and the changeable information from the input cancellation key issuing number. The present invention, however, is not limited to such an embodiment. By way of example, management server 12 may obtain the unique information and the changeable information periodically from image processing apparatus 10, by data communication through network 20. In that case, management server 12 may issue the cancellation key based on the unique information and the changeable information it manages, if it receives a request for issuing the cancellation key from the service person. Therefore, the service person can save the trouble of inputting the cancellation key issuing number.

Further, in the embodiment above, the registration data is stored in HDD 52. The present invention, however, is not limited to such an embodiment. By way of example, the data may be stored in an EEPROM (Electrically Erasable Programmable ROM), SRAM (Static Random Access Memory) or an SD (Secure Digital) memory card.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image processing apparatus executing a process corresponding to a requested function, comprising:
   a first storage unit storing registration information registered for executing said function;
   a receiving unit receiving an instruction requesting erasure of the registration information stored in said first storage unit;
   an erasing unit, responsive to reception of the instruction by said receiving unit, for erasing the registration information stored in said first storage unit;
   a restricting unit, responsive to erasure of the registration information by said erasing unit, for restricting an operation of the image processing apparatus;
   a second storage unit storing unique information unique to the image processing apparatus and changeable information changed in response to the erasure of the registration information by said erasing unit;
   an input unit receiving an input of cancellation information for cancelling the operation restriction imposed by said restricting unit;
   a determining unit, responsive to said input unit receiving input of said cancellation information, for determining whether said received cancellation information is cancellation information corresponding to said unique information and said changeable information stored in said second storage unit; and
   a cancelling unit cancelling, if said received cancellation information is determined to be the cancellation information corresponding to the unique information and said changeable information by said determining unit, the operation restriction imposed by said restricting unit.

2. The image processing apparatus according to claim 1, wherein said changeable information is the number of erasure of registration information by said erasing unit.

3. The image processing apparatus according to claim 1, wherein said changeable information is the number of cancellation of operation restriction by said cancelling unit.

4. The image processing apparatus according to claim 1, wherein said image processing apparatus has at least one of scanner function, image data transmitting/receiving function and printer function, and
   said registration information includes at least one of communication partner information and image data; or
   said image processing apparatus has at least copy function, and
   said registration information includes at least image data.

5. The image processing apparatus according to claim 1, further comprising a generating unit generating and displaying specifying information for generating said cancellation information, based on said unique information and said changeable information.

6. A management system comprising an image processing apparatus executing a process corresponding to a requested function and a management apparatus managing said image processing apparatus, wherein
   said image processing apparatus includes:
   a first storage unit storing registration information registered for executing said function;
   a receiving unit receiving an instruction requesting erasure of the registration information stored in said first storage unit;
   an erasing unit, responsive to reception of the instruction by said receiving unit, for erasing the registration information stored in said first storage unit;
   a restricting unit, responsive to erasure of the registration information by said erasing unit, for restricting an operation of the image processing apparatus;
   a second storage unit storing unique information unique to the image processing apparatus and changeable information changed in response to the erasure of the registration information by said erasing unit;
   an input unit receiving an input of cancellation information for cancelling the operation restriction imposed by said restricting unit;
   a determining unit, responsive to said input unit receiving input of said cancellation information, for determining whether said received cancellation information is cancellation information corresponding to said unique information and said changeable information stored in said second storage unit; and
   a cancelling unit for cancelling, if said received cancellation information is determined to be the cancellation information corresponding to the unique information and said changeable information by said determining unit, the operation restriction imposed by said restricting unit; and
   said management apparatus includes:
   an obtaining unit obtaining specifying information allowing specification of said unique information and said changeable information stored in said second storage unit; and
   an issuing unit issuing said cancellation information corresponding to said unique information and said changeable information, based on said specifying information obtained by said obtaining unit.

7. The management system according to claim 6, wherein said management apparatus further includes:
   a specifying unit specifying said unique information and said changeable information based on the specifying information obtained by said obtaining unit; and
   a third storage unit storing said unique information and said changeable information specified by said specifying unit.

8. The management system according to claim 6, wherein said image processing apparatus further includes a generating unit generating said specifying information based on said unique information and said changeable information.

9. A control method of controlling an image processing apparatus including a storage unit and an operation unit, executing a process corresponding to a requested function, comprising the steps of:
- storing information input for executing said function as registration information in said storage unit;
- receiving an instruction requesting erasure of the registration information stored in said storage unit through said operation unit;
- erasing the registration information stored in said storage unit, in response to reception of said instruction;
- setting operation restriction of said image processing apparatus, in response to erasure of said registration information;
- storing unique information unique to said image processing apparatus and changeable information changed in response to erasure of said registration information in said storage unit;
- receiving an input of cancellation information for cancelling said operation restriction through said operation unit;
- determining, in response to reception of the input of said cancellation information, whether or not said received cancellation information is cancellation information corresponding to said unique information and said changeable information stored in said storage unit; and
- cancelling said operation restriction if said received cancellation information is determined to be the cancellation information corresponding to said unique information and said changeable information.

10. The control method according to claim 9, further comprising the step of generating and displaying specifying information for generating said cancellation information, based on said unique information and said changeable information.

11. The control method according to claim 9, further comprising the step of controlling a management apparatus managing said image processing apparatus; wherein
said step of controlling said management apparatus includes the steps of
obtaining specifying information allowing specification of said unique information and said changeable information stored in said storage unit, and
issuing said cancellation information corresponding to said unique information and said changeable information, based on said obtained specifying information.

12. The control method according to claim 11, wherein
said step of controlling said management apparatus further includes the steps of
specifying said unique information and said changeable information based on said obtained specifying information, and
storing said specified unique information and said changeable information in a storage unit of said management apparatus.

13. The control method according to claim 11, further comprising the step of generating said specifying information based on said unique information and said changeable information.

* * * * *